US012719842B1

(12) United States Patent
Shevade et al.

(10) Patent No.: US 12,719,842 B1
(45) Date of Patent: Aug. 25, 2026

(54) PROVIDER SUBSTRATE EXTENSION CONNECTIVITY USING SECURE SERVICE LINKS

(71) Applicant: Amazon Technologies, Inc., Seattle, WA (US)

(72) Inventors: Upendra Bhalchandra Shevade, Washington, DC (US); Ethan Joseph Torretta, Edmonds, WA (US); Bradley Ryan Toth, Bellevue, WA (US); Marc Stephen Olson, Bellevue, WA (US); Andrew J. Lusk, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 62 days.

(21) Appl. No.: 18/900,149

(22) Filed: Sep. 27, 2024

(51) Int. Cl.
*H04L 29/06* (2006.01)
*H04L 9/40* (2022.01)

(52) U.S. Cl.
CPC ...... *H04L 63/0435* (2013.01); *H04L 63/0407* (2013.01); *H04L 63/0876* (2013.01)

(58) Field of Classification Search
None
See application file for complete search history.

(56) References Cited

U.S. PATENT DOCUMENTS 9,201,704 B2 * 12/2015 Chang ................ G06F 9/45558
9,270,449 B1 * 2/2016 Tribble ............... H04L 63/0435
9,521,126 B2 * 12/2016 Yarvis ................ H04L 63/0442
9,678,803 B2 * 6/2017 Suit ..................... H04L 41/0897
10,965,737 B1 * 3/2021 Parulkar ................ H04L 67/52
11,431,497 B1 * 8/2022 Liguori ................. H04L 9/0897
11,640,484 B1 * 5/2023 Kumar ................ G06F 21/6209 726/26
2010/0318609 A1 * 12/2010 Lahiri .................. G06F 9/5072 713/153
2011/0093707 A1 * 4/2011 Green ................ G06F 21/6218 713/168
2012/0060153 A1 * 3/2012 Bealkowski ........ G06F 9/45558 718/1
2018/0152291 A1 * 5/2018 Barney ..................... H04L 9/32
2023/0006981 A1 * 1/2023 Syrivelis ............ G06F 9/45558

* cited by examiner

*Primary Examiner* — Maung T Lwin
(74) *Attorney, Agent, or Firm* — Nicholson De Vos Webster & Elliott LLP

(57) ABSTRACT

Techniques for utilizing a cloud-side link module and a provider substrate extension (PSE) link module to secure a communications channel between a cloud provider network and a provider substrate extension are described. A PSE link module receives a request originated by a compute instance in the PSE that is destined to a destination within the cloud provider network. The request was encrypted using an encryption scheme that encrypts traffic of a virtual private cloud that the compute instance operates in. The PSE link module decrypts the first request, encrypts it using a separate encryption scheme, and transmits it via a secure tunnel to a second link module in the cloud provider network. The second link module can decrypt the encrypted traffic and cause it to be validated before it is passed on via the cloud provider's substrate network to be processed.

19 Claims, 10 Drawing Sheets

OPERATIONS 700

RECEIVING, AT A FIRST LINK MODULE DEPLOYED IN A PROVIDER SUBSTRATE EXTENSION OF A CLOUD PROVIDER NETWORK, A FIRST ENCRYPTED REQUEST DESTINED TO A SERVICE OPERATED WITHIN THE CLOUD PROVIDER NETWORK, WHEREIN THE FIRST ENCRYPTED REQUEST WAS ORIGINATED BY A COMPUTE INSTANCE OF A USER THAT OPERATES WITHIN A VIRTUAL PRIVATE CLOUD OF THE USER, WHEREIN THE COMPUTE INSTANCE IS HOSTED IN THE PROVIDER SUBSTRATE EXTENSION, AND WHEREIN THE FIRST ENCRYPTED REQUEST WAS ENCRYPTED VIA USE OF AN ENCRYPTION SCHEME THAT ENCRYPTS TRAFFIC OF THE VIRTUAL PRIVATE CLOUD 702

DECRYPTING, BY THE FIRST LINK MODULE, THE FIRST ENCRYPTED REQUEST TO YIELD A REQUEST 704

ENCRYPTING, BY THE FIRST LINK MODULE, THE REQUEST USING A SEPARATE ENCRYPTION SCHEME THAT ENCRYPTS TRAFFIC BETWEEN THE PROVIDER SUBSTRATE EXTENSION AND THE CLOUD PROVIDER NETWORK TO YIELD A SECOND ENCRYPTED REQUEST 706

TRANSMITTING, BY THE FIRST LINK MODULE, THE SECOND ENCRYPTED REQUEST TO A SECOND LINK MODULE DEPLOYED IN THE CLOUD PROVIDER NETWORK 708

*FIG. 7*

PROVIDER SUBSTRATE EXTENSION CONNECTIVITY USING SECURE SERVICE LINKS

BACKGROUND

Cloud computing provides on-demand, managed computing resources to customers. Such computing resources (e.g., compute and storage capacity) are often provisioned from large pools of capacity installed in data centers. Customers can request computing resources from the "cloud" and the cloud can provision compute resources to those customers. Technologies such as virtual machines and containers are often used to allow customers to securely share capacity of computer systems.

An "edge location" of a cloud provider network can be used to refer to a data center or collection of physical computing resource capacity that is strategically positioned closer to end-users to reduce latency and improve the speed and performance of content delivery. Edge locations can enable users to access content more quickly and reliably, as the data doesn't have to travel long distances from more "primary" data centers. This can be particularly beneficial for applications requiring real-time data processing, such as streaming services, online gaming, and IoT devices. Furthermore, edge locations can provide localized services, such as compliance with regional data regulations and improved security measures tailored to specific geographic areas. By leveraging edge locations, cloud providers can offer a more robust and efficient service to their global customer base.

BRIEF DESCRIPTION OF DRAWINGS

Various examples in accordance with the present disclosure will be described with reference to the drawings, in which:

FIG. 7 is a flow diagram illustrating operations of a method for utilizing a secure communications link between a cloud provider network and a provider substrate extension according to some examples.

DETAILED DESCRIPTION

Figure 1:
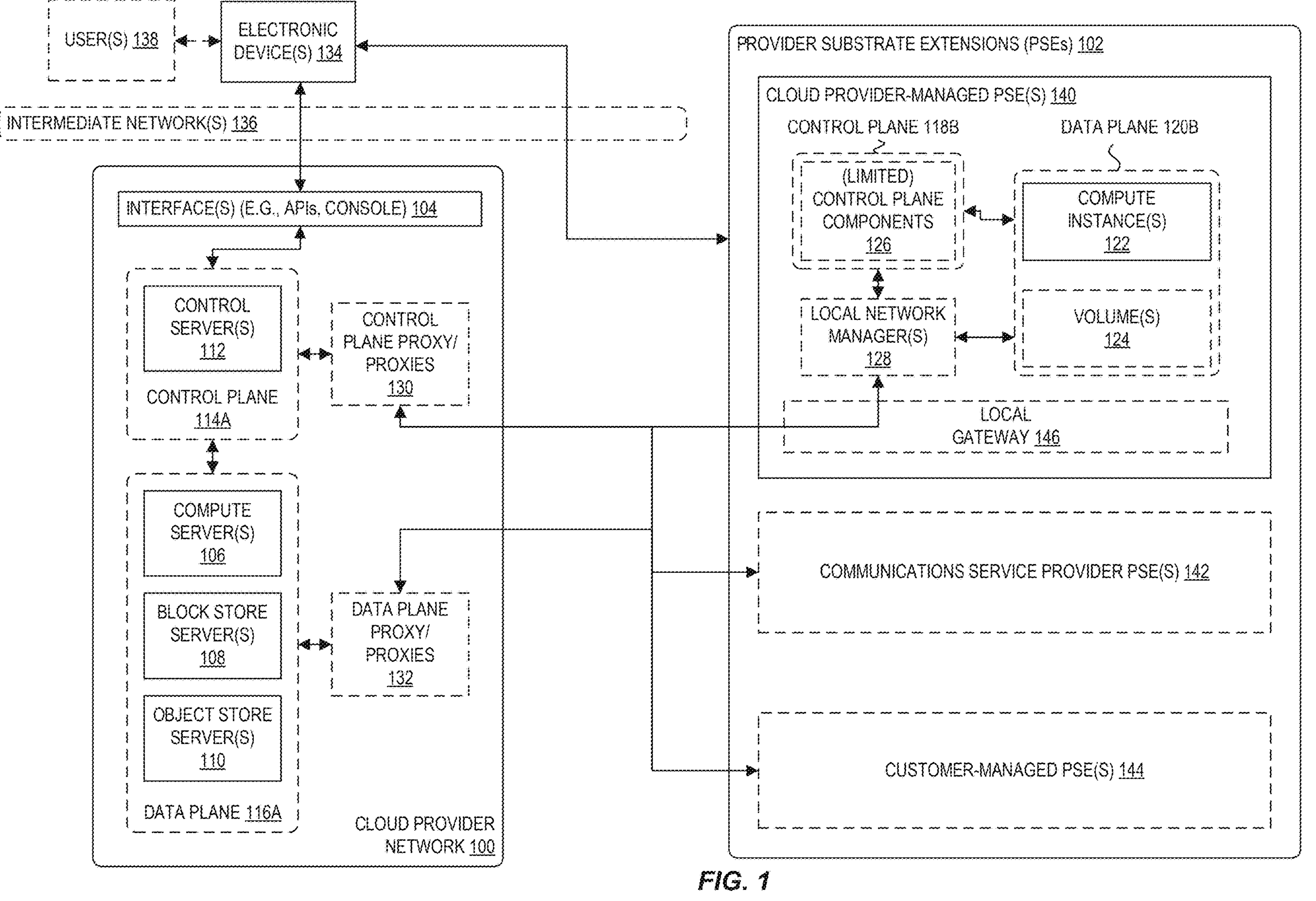
FIG. 1 illustrates an exemplary system including a cloud provider network and further including various provider substrate extensions of the cloud provider network according to some examples.

Data centers and cloud computing environments often require securely connecting geographically distributed computing resources. Achieving strong isolation between different locations while maintaining high performance connectivity can be technically challenging. Existing approaches may rely on sharing sensitive infrastructure secrets across locations, which can introduce security risks if one site is compromised. Additionally, inspecting and validating traffic between sites typically requires complex networking configurations that can impact performance and scalability.

The technology of the present disclosure addresses these challenges, among others, by providing a secure and scalable solution for connecting remote computing sites to a parent data center. A firewalled link is established between the remote site and parent location using encrypted transport and dedicated inspection components. This allows the remote site to leverage the scale and capabilities of the parent data center while maintaining strict security boundaries. Traffic is validated and re-encrypted at both ends of the link using separate encryption keys. The system supports high bandwidth and large packet sizes to enable demanding workloads. By combining secure connectivity with robust isolation, the technology enables new deployment models for distributed cloud infrastructure.

For example, in some implementations the secure connectivity component that implements the parent-child link between the remote site and parent region can combine secure transport endpoints, routing, and traffic inspection/re-encryption into a single integrated system. Traffic from the remote site is first encrypted using a key specific to that location, then transmitted over a secure transport connection to the parent region. At the parent end, the connectivity component decrypts the traffic, validates the source and destination, and re-encrypts it using a separate key for the parent region before forwarding it to the final destination. This approach maintains strict credential separation between the remote site and parent, even if one location is compromised.

The connectivity component can, in some implementations, support high bandwidth and large maximum transmission unit (MTU) to enable demanding workloads across the parent-child link. The high bandwidth capacity (for example, 100 Gbps to 1 Tbps in some implementations) of the connectivity component can be achieved through parallel processing and load balancing across multiple network interfaces and compute resources. The system can be designed to scale out by adding more processing and network capacity as needed to handle increasing traffic demands. Additionally, the use of advanced network technologies, such as high-speed interconnects and optimized packet processing, can enable the component to sustain line-rate throughput even for large data transfers. The support for large MTU (for example, up to 8801 bytes in some implementations) can be enabled by specialized network drivers and packet fragmentation/reassembly logic within the connectivity component, which allow it to efficiently transmit jumbo frames without the overhead of breaking them into smaller packets. The large MTU reduces the number of packets that need to be processed, improving overall throughput and reducing latency for the parent-child link. The combination of high bandwidth and large MTU capabilities makes the connectivity solution well-suited to support demanding distributed cloud workloads that require fast, low-latency data transfers between remote sites and parent regions.

Accordingly, the present disclosure relates to methods, apparatus, systems, and non-transitory computer-readable storage media for implementing and utilizing a firewalled secure communications channel between a provider substrate extension and a cloud provider network. According to some examples, a communications channel is established using an architectural configuration that separates encryption credentials to protect the cloud provider network in the event of a provider substrate extension being compromised. In some examples, traffic passing via this secure communications channel is further analyzed and validated to "firewall" the cloud provider network (and the services available therein), further reducing the likelihood of malicious activity originating from the provider substrate extension making its way into the network substrate of the cloud provider network. Accordingly, using the techniques and architectures disclosed herein, examples provide increased network security for these inter-site communications while further increasing network security for the cloud provider network itself.

A cloud provider network, or "cloud," refers to a large pool of network-accessible computing resources (such as compute, storage, and networking resources, applications, and services). The cloud can provide convenient, on-demand network access to a shared pool of configurable computing resources that can be programmatically provisioned and released in response to customer commands. Cloud computing can thus be considered as both the applications delivered as services over a publicly accessible network (e.g., the Internet, a cellular communication network) and the hardware and software in cloud provider data centers that provide those services. Some customers may desire to use the resources and services of such cloud provider networks, but for various reasons (e.g., latency in communications with customer devices, legal compliance, security, or other reasons) prefer for these resources and services to be provisioned within their own network (for example on premises of the customer), at a separate network managed by the cloud provider, within a network of a communications service provider, or within another independent network.

In some examples, segments of a cloud provider network—referred to herein as a "provider substrate extension" (PSE) or "edge location" (EL)—can be provisioned within a network and location that is separate from the cloud provider network. For example, a cloud provider network typically includes a physical network (e.g., sheet metal boxes, cables, rack hardware) referred to as the substrate. The substrate can be considered as a network fabric containing the physical hardware that runs the services of the provider network. In some implementations, a provider substrate "extension" may be an extension of the cloud provider network substrate formed by one or more servers located on-premise in a customer or partner facility, in a separate cloud provider-managed facility, in a communications service provider facility, or in any other type of facility including servers where such server(s) communicate over a network (e.g., a publicly-accessible network such as the Internet) with a nearby availability zone or region of the cloud provider network. Customers may access a provider substrate extension via the cloud provider substrate or another network and may use the same application programming interfaces (APIs) to create and manage resources in the provider substrate extension as they would use to create and manage resources in the region of a cloud provider network.

A cloud provider network can be formed as a number of regions, where a region is a geographical area in which the cloud provider clusters data centers. Each region includes multiple (e.g., two or more) availability zones (AZs) connected to one another via a private high-speed network, for example a fiber communication connection. An AZ (also known as a "zone") typically provides an isolated failure domain including one or more data center facilities with separate power, separate networking, and separate cooling from those in another AZ. A data center refers to a physical building or enclosure that houses and provides power and cooling to servers of the cloud provider network. Preferably, AZs within a region are positioned far enough away from one another so that a natural disaster (or other failure-inducing event) should not affect or take more than one AZ offline at the same time.

As indicated above, one example type of provider substrate extension is one that is formed by servers located on-premise in a customer or partner facility. This type of substrate extension located outside of cloud provider network data centers can be referred to as an "outpost" of the cloud provider network. Another example type of provider substrate extension is one that is formed by servers located in a facility managed (or controlled, utilized, etc.) by the cloud provider but that includes data plane capacity controlled at least partly by a separate control plane of the cloud provider network, which can be referred to as a "local zone." A local zone can be available for multiple customers of the cloud provider network (e.g., to launch compute instances into, or utilize other cloud services), or dedicated for use by a single customer or limited set of customers. In yet other examples, another type of a provider substrate extension can be one deployed within a communications service provider network, such as mobile or cellular network providers (e.g., operating 3G, 4G, and/or 5G networks), wired internet service providers (e.g., cable, digital subscriber lines, fiber, etc.), WiFi providers (e.g., at locations such as hotels, coffee shops, airports, etc.), etc.

FIG. 1 illustrates an exemplary system including a cloud provider network and further including various provider substrate extensions of the cloud provider network according to some examples. A cloud provider network 100 (sometimes referred to simply as a "cloud") refers to a pool of network-accessible computing resources (such as compute, storage, and networking resources, applications, and services), which may be virtualized or bare-metal. The cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet, a cellular communication network) and the hardware and software in cloud provider data centers that provide those services.

The cloud provider network 100 can provide on-demand, scalable computing platforms to users through a network, for example, allowing users to have at their disposal scalable "virtual computing devices" via their use of the compute servers (which provide compute instances via the usage of one or both of central processing units (CPUs) and graphics processing units (GPUs), optionally with local storage) and block store servers (which provide virtualized persistent block storage for designated compute instances). These virtual computing devices have attributes of a personal computing device including hardware (various types of processors, local memory, random access memory (RAM), hard-disk, and/or solid-state drive (SSD) storage), a choice of operating systems, networking capabilities, and pre-loaded application software. Each virtual computing device may also virtualize its console input and output (e.g., keyboard, display, and mouse). This virtualization allows users to connect to their virtual computing device using a computer application such as a browser, application programming interface (API), software development kit (SDK), or the like, in order to configure and use their virtual computing device just as they would a personal computing device. Unlike personal computing devices, which possess a fixed quantity of hardware resources available to the user, the hardware associated with the virtual computing devices can be scaled up or down depending upon the resources the user requires.

As indicated above, users (e.g., users 138) can connect to virtualized computing devices and other cloud provider network 100 resources and services using various interfaces 104 (e.g., APIs) via intermediate network(s) 136. An API refers to an interface and/or communication protocol between a client (e.g., an electronic device 134) and a server, such that if the client makes a request in a predefined format, the client should receive a response in a specific format or cause a defined action to be initiated. In the cloud provider network context, APIs provide a gateway for customers to access cloud infrastructure by allowing customers to obtain data from or cause actions within the cloud provider network, enabling the development of applications that interact with resources and services hosted in the cloud provider network. APIs can also enable different services of the cloud provider network to exchange data with one another. Users can choose to deploy their virtual computing systems to provide network-based services for their own use and/or for use by their customers or clients.

The cloud provider network 100 can include a physical network (e.g., sheet metal boxes, cables, rack hardware) referred to as the substrate. The substrate can be considered as a network fabric containing the physical hardware that runs the services of the provider network. The substrate may be isolated from the rest of the cloud provider network 100, for example it may not be possible to route from a substrate network address to an address in a production network that runs services of the cloud provider, or to a customer network (e.g., a virtual private cloud) that hosts customer resources.

The cloud provider network 100 can also include an overlay network of virtualized computing resources that run on the substrate. In at least some examples, hypervisors or other devices or processes on the network substrate may use encapsulation protocol technology to encapsulate and route network packets (e.g., client IP packets) over the network substrate between client resource instances on different hosts within the provider network. The encapsulation protocol technology may be used on the network substrate to route encapsulated packets (also referred to as network substrate packets) between endpoints on the network substrate via overlay network paths or routes. The encapsulation protocol technology may be viewed as providing a virtual network topology overlaid on the network substrate. As such, network packets can be routed along a substrate network according to constructs in the overlay network (e.g., virtual networks that may be referred to as virtual private clouds (VPCs), port/protocol firewall configurations that may be referred to as security groups). A mapping service (not shown) can coordinate the routing of these network packets. The mapping service can be a regional distributed look up service that maps the combination of overlay internet protocol (IP) and network identifier to substrate IP so that the distributed substrate computing devices can look up where to send packets.

To illustrate, a physical host device (e.g., a compute server 106, a block store server 108, an object store server 110, a control server 112) can have an IP address in the substrate network. Hardware virtualization technology can enable multiple operating systems to run concurrently on a host computer, for example as virtual machines (VMs) on a compute server 106. A hypervisor, or virtual machine monitor (VMM), on a host allocates the host's hardware resources amongst various VMs on the host and monitors the execution of VMs. Each VM may be provided with one or more IP addresses in an overlay network, and the VMM on a host may be aware of the IP addresses of the VMs on the host. The VMMs (and/or other devices or processes on the network substrate) may use encapsulation protocol technology to encapsulate and route network packets (e.g., client IP packets) over the network substrate between virtualized resources on different hosts within the cloud provider network 100. The encapsulation protocol technology may be used on the network substrate to route encapsulated packets between endpoints on the network substrate via overlay network paths or routes. The encapsulation protocol technology may be viewed as providing a virtual network topology overlaid on the network substrate. The encapsulation protocol technology may include the mapping service that maintains a mapping directory that maps IP overlay addresses (e.g., IP addresses visible to customers) to substrate IP addresses (IP addresses not visible to customers), which can be accessed by various processes on the cloud provider network for routing packets between endpoints.

As illustrated, the traffic and operations of the cloud provider network substrate may broadly be subdivided into two categories in various examples: control plane traffic carried over a logical control plane 114A and data plane operations carried over a logical data plane 116A. While the data plane 116A represents the movement of user data through the distributed computing system, the control plane 114A represents the movement of control signals through the distributed computing system. The control plane 114A generally includes one or more control plane components or services distributed across and implemented by one or more control servers 112. Control plane traffic generally involves administrative operations, such as establishing isolated virtual networks for various customers, monitoring resource usage and health, identifying a particular host or server at which a requested compute instance is to be launched, provisioning additional hardware as needed, and so on. The data plane 116A includes customer resources that are implemented on the cloud provider network (e.g., computing instances, containers, block storage volumes, databases, file storage). Data plane traffic generally includes non-administrative operations such as transferring data to and from the customer resources, sending application-layer requests to or from customer instances, or the like.

The control plane components are typically implemented on a separate set of servers from the data plane servers, and control plane traffic and data plane traffic may be sent over separate/distinct networks. In some examples, control plane traffic and data plane traffic can be supported by different protocols. In some examples, messages (e.g., packets) sent over the cloud provider network 100 include a flag to indicate whether the traffic is control plane traffic or data plane traffic. In some examples, the payload of traffic may be inspected to determine its type (e.g., whether control or data plane). Other techniques for distinguishing traffic types are possible.

As illustrated, the data plane 116A can include one or more compute servers 106, which may be bare metal (e.g., single tenant) or may be virtualized by a hypervisor to run multiple VMs (sometimes referred to as "instances") or microVMs for one or more customers. These compute servers 106 can support a virtualized computing service (or "hardware virtualization service" or "managed compute service") of the cloud provider network. The virtualized computing service may be part of the control plane 114A, allowing customers to issue commands via an interface 104 (e.g., an API) to launch and manage compute instances (e.g., VMs, or potentially even containers) for their applications.

A virtualized computing service may offer virtual compute instances with varying computational and/or memory resources. In one example, each of the virtual compute instances may correspond to one of several instance types. An instance type may be characterized by its hardware type, computational resources (e.g., number, type, and configuration of CPUs or CPU cores), memory resources (e.g., capacity, type, and configuration of local memory), storage resources (e.g., capacity, type, and configuration of locally accessible storage), network resources (e.g., characteristics of its network interface and/or network capabilities), and/or other suitable descriptive characteristics. Using instance type selection functionality, an instance type may be selected for a customer, e.g., based (at least in part) on input from the customer. For example, a customer may choose an instance type from a predefined set of instance types. As another example, a customer may specify the desired resources of an instance type and/or requirements of a workload that the instance will run, and the instance type selection functionality may select an instance type based on such a specification. A cloud service provider may provide a selection of instance types optimized to fit different use cases, where each instance type comprises a varying combination of CPU, memory, storage, and/or networking capacity to give users the flexibility to choose an appropriate mix of resources for their particular applications. An instance type may include one or more instance sizes (e.g., a "medium" instance of a type may have double the amount of resources than a "small" instance of the same type), allowing customers to scale their resources to the requirements of a target workload. In some examples, instance types may be classified into "families" based on their intended use cases (and the amounts or types of computing resources provided), such as general purpose instances suitable for various scenarios with a balance of CPU, RAM, and networking resources; compute-optimized instances designed for applications that require high CPU performance, memory optimized instances that are suited for memory-intensive workloads, storage-optimized instances geared towards applications requiring high storage capacity and I/O performance, accelerated computing instances intended for GPU or FPGA workloads, etc.

The data plane 116A can also include one or more block store servers 108, which can include persistent storage for storing volumes of customer data as well as software for managing these volumes. These block store servers 108 can support a managed block storage service of the cloud provider network. The managed block storage service may be part of the control plane 114A, allowing customers to issue commands via the interface 104 (e.g., an API) to create and manage volumes for their applications running on compute instances. The block store servers 108 include one or more servers on which data is stored as blocks. A block is a sequence of bytes or bits, usually containing some whole number of records, having a maximum length of the block size. Blocked data is normally stored in a data buffer and read or written a whole block at a time. In general, a volume can correspond to a logical collection of data, such as a set of data maintained on behalf of a user. User volumes, which can be treated as an individual hard drive ranging for example from 1 GB to 1 terabyte (TB) or more in size, are made of one or more blocks stored on the block store servers. Although treated as an individual hard drive, it will be appreciated that a volume may be stored as one or more virtualized devices implemented on one or more underlying physical host devices. Volumes may be partitioned a small number of times (e.g., up to 16) with each partition hosted by a different host. The data of the volume may be replicated between multiple devices within the cloud provider network, in order to provide multiple replicas of the volume (where such replicas may collectively represent the volume on the computing system). Replicas of a volume in a distributed computing system can beneficially provide for automatic failover and recovery, for example by allowing the user to access either a primary replica of a volume or a secondary replica of the volume that is synchronized to the primary replica at a block level, such that a failure of either the primary or secondary replica does not inhibit access to the information of the volume. The role of the primary replica can be to facilitate reads and writes (sometimes referred to as "input output operations," or simply "I/O operations") at the volume, and to propagate any writes to the secondary (preferably synchronously in the I/O path, although asynchronous replication can also be used). The secondary replica can be updated synchronously with the primary replica and provide for seamless transition during failover operations, whereby the secondary replica assumes the role of the primary replica, and either the former primary is designated as the secondary or a new replacement secondary replica is provisioned. Although certain examples herein discuss a primary replica and a secondary replica, it will be appreciated that a logical volume can include multiple secondary replicas. A compute instance can virtualize its I/O to a volume by way of a client. The client represents instructions that enable a compute instance to connect to, and perform I/O operations at, a remote data volume (e.g., a data volume stored on a physically separate computing device accessed over a network). The client may be implemented on an offload card of a server that includes the processing units (e.g., CPUs or GPUs) of the compute instance.

The data plane 116A can also include one or more object store servers 110, which represent another type of storage within the cloud provider network. The object store servers 110 include one or more servers on which data is stored as objects within resources referred to as buckets and can be used to support a managed object storage service of the cloud provider network. Each object typically includes the data being stored, a variable amount of metadata that enables various capabilities for the object storage servers with respect to analyzing a stored object, and a globally unique identifier or key that can be used to retrieve the object. Each bucket is associated with a given user account. Customers can store as many objects as desired within their buckets, can write, read, and delete objects in their buckets, and can control access to their buckets and the objects contained therein. Further, in examples having a number of different object storage servers distributed across different ones of the regions described above, users can choose the region (or regions) where a bucket is stored, for example to optimize for latency. Customers may use buckets to store objects of a variety of types, including machine images that can be used to launch VMs, and snapshots that represent a point-in-time view of the data of a volume.

As introduced herein, a provider substrate extension 102 (or "PSE") provides resources and services of the cloud provider network 100 within a separate network, thereby extending functionality of the cloud provider network 100 to new locations (e.g., for reasons related to latency in communications with customer devices, legal compliance, security, etc.). As indicated, such provider substrate extensions 102 can include cloud provider network-managed provider substrate extensions 140 (e.g., formed by servers located in a cloud provider-managed facility separate from those associated with the cloud provider network 100), communications service provider substrate extensions 142 (e.g., formed by servers associated with communications service provider facilities), customer-managed provider substrate extensions 144 (e.g., formed by servers located on-premise in a customer or partner facility), among other possible types of substrate extensions.

As illustrated in the example provider substrate extension 140, a provider substrate extension 102 can similarly include a logical separation between a control plane 118B and a data plane 120B, respectively extending the control plane 114A and data plane 116A of the cloud provider network 100. The provider substrate extension 102 may be pre-configured, e.g. by the cloud provider network operator, with an appropriate combination of hardware with software and/or firmware elements to support various types of computing-related resources, and to do so in a manner that may mirror the experience of using the cloud provider network. For example, one or more provider substrate extension location servers can be provisioned by the cloud provider for deployment within a provider substrate extension 102. As described above, the cloud provider network 100 may offer a set of predefined instance types, each having varying types and quantities of underlying hardware resources. Each instance type may also be offered in various sizes. In order to enable customers to continue using the same instance types and sizes in a provider substrate extension 102 as they do in the region, the servers can be heterogeneous servers. A heterogeneous server can concurrently support multiple instance sizes of the same type and may be also reconfigured to host whatever instance types are supported by its underlying hardware resources. The reconfiguration of the heterogeneous server can occur on-the-fly using the available capacity of the servers, that is, while other VMs are still running and consuming other capacity of the provider substrate extension location servers. This can improve utilization of computing resources within the edge location by allowing for better packing of running instances on servers, and also provides a seamless experience regarding instance usage across the cloud provider network 100 and the cloud provider network provider substrate extension.

As illustrated, the provider substrate extension servers can host one or more compute instances 122. Compute instances 122 in many cases are VMs, though in some examples can be containers that package up code and all its dependencies so an application can run quickly and reliably across computing environments (e.g., including VMs). In addition, the servers may host one or more data volumes 124, if desired by the customer. In the region of a cloud provider network 100, such volumes may be hosted on dedicated block store servers. However, due to the possibility of having a significantly smaller capacity at a provider substrate extension 102 than in the region, an optimal utilization experience may not be provided if the provider substrate extension includes such dedicated block store servers. Accordingly, a block storage service may be virtualized in the provider substrate extension 102, such that one of the VMs runs the block store software and stores the data of a volume 124. Similar to the operation of a block storage service in the region of a cloud provider network 100, the volumes 124 within a provider substrate extension 102 may be replicated for durability and availability. The volumes may be provisioned within their own isolated virtual network within the provider substrate extension 102. The compute instances 122 and any volumes 124 collectively make up a data plane 120B extension of the provider network data plane 116A within the provider substrate extension 102.

The servers within a provider substrate extension 102 may, in some implementations, host certain local control plane components 126, for example, components that enable the provider substrate extension 102 to continue functioning if there is a break in the connection back to the cloud provider network 100. Examples of these components include a migration manager that can move compute instances 122 between provider substrate extension servers if needed to maintain availability, and/or a key value data store that indicates where volume replicas are located. However, generally the control plane 118B functionality for a provider substrate extension will remain in the cloud provider network 100 to allow customers to use as much resource capacity of the provider substrate extension as possible.

Server software running at a provider substrate extension 102 may be designed by the cloud provider to run on the cloud provider substrate network, and this software may be enabled to run unmodified in a provider substrate extension 102 by using local network manager(s) 128 to create a private replica of the substrate network within the edge location (a "shadow substrate"). The local network manager(s) 128 can run on provider substrate extension 102 servers and bridge the shadow substrate with the provider substrate extension 102 network, for example, by acting as a virtual private network (VPN) endpoint or endpoints between the provider substrate extension 102 and the proxies 130, 132 in the cloud provider network 100 and by implementing the mapping service (for traffic encapsulation and decapsulation) to relate data plane traffic (from the data plane proxies) and control plane traffic (from the control plane proxies) to the appropriate server(s). By implementing a local version of the provider network's substrate-overlay mapping service, the local network manager(s) 128 allow resources in the provider substrate extension 102 to seamlessly communicate with resources in the cloud provider network 100. In some implementations, a single local network manager can perform these actions for all servers hosting compute instances 122 in a provider substrate extension 102. In other implementations, each of the server hosting compute instances 122 may have a dedicated local network manager. In multi-rack edge locations, inter-rack communications can go through the local network managers, with local network managers maintaining open tunnels to one another.

Provider substrate extension locations can utilize secure networking tunnels through the provider substrate extension 102 network to the cloud provider network 100, for example, to maintain security of customer data when traversing the provider substrate extension 102 network and any other intermediate network (which may include the public internet). Within the cloud provider network 100, these tunnels are composed of virtual infrastructure components including isolated virtual networks (e.g., in the overlay network), control plane proxies 130, data plane proxies 132, and substrate network interfaces. Such proxies may be implemented as containers running on VM compute instances. In some examples, a server in a provider substrate extension 102 location that hosts compute instances can utilize at least two tunnels: one for control plane traffic (e.g., Constrained Application Protocol (CoAP) traffic) and one for encapsulated data plane traffic. A connectivity manager (not shown) within the cloud provider network manages the cloud provider network-side lifecycle of these tunnels and their components, for example, by provisioning them automatically when needed and maintaining them in a healthy operating state. In some examples, a direct connection between a provider substrate extension 102 location and the cloud provider network 100 can be used for control and data plane communications. As compared to a VPN through other networks, the direct connection can provide constant bandwidth and more consistent network performance because of its relatively fixed and stable network path.

A control plane (CP) proxy 130, in some examples, can be provisioned in the cloud provider network 100 to represent particular host(s) in an edge location. CP proxies are intermediaries between the control plane 114A in the cloud provider network 100 and control plane targets in the control plane 118B of provider substrate extension 102. That is, CP proxies 130 provide infrastructure for tunneling management API traffic destined for provider substrate extension servers out of the region substrate and to the provider substrate extension 102. For example, a virtualized computing service of the cloud provider network 100 can issue a command to a VMM of a server of a provider substrate extension 102 to launch a compute instance 122. A CP proxy maintains a tunnel (e.g., a VPN) to a local network manager 128 of the provider substrate extension. The software implemented within the CP proxies ensures that only well-formed API traffic leaves from and returns to the substrate. CP proxies provide a mechanism to expose remote servers on the cloud provider substrate while still protecting substrate security materials (e.g., encryption keys, security tokens) from leaving the cloud provider network 100. The one-way control plane traffic tunnel imposed by the CP proxies also prevents any (potentially compromised) devices from making calls back to the substrate. CP proxies may be instantiated one-for-one with servers at a provider substrate extension 102 or may be able to manage control plane traffic for multiple servers in the same provider substrate extension.

A data plane (DP) proxy 132 can also be provisioned in the cloud provider network 100 to represent particular server(s) in a provider substrate extension 102. The DP proxy 132 acts as a shadow or anchor of the server(s) and can be used by services within the cloud provider network 100 to monitor health of the host (including its availability, used/free compute and capacity, used/free storage and capacity, and network bandwidth usage/availability). The DP proxy 132 also allows isolated virtual networks to span provider substrate extensions 102 and the cloud provider network 100 by acting as a proxy for server(s) in the cloud provider network 100. Each DP proxy 132 can be implemented as a packet-forwarding compute instance or container. As illustrated, each DP proxy 132 can maintain a VPN tunnel with a local network manager 128 that manages traffic to the server(s) that the DP proxy 132 represents. This tunnel can be used to send data plane traffic between the provider substrate extension server(s) and the cloud provider network 100. Data plane traffic flowing between a provider substrate extension 102 and the cloud provider network 100 can be passed through DP proxies 132 associated with that provider substrate extension. For data plane traffic flowing from a provider substrate extension 102 to the cloud provider network 100, DP proxies 132 can receive encapsulated data plane traffic, validate it for correctness, and allow it to enter into the cloud provider network 100. DP proxies 132 can forward encapsulated traffic from the cloud provider network 100 directly to a provider substrate extension 102.

Local network manager(s) 128 can provide secure network connectivity with the proxies 130, 132 established in the cloud provider network 100. After connectivity has been established between the local network manager(s) 128 and the proxies, customers may issue commands via the interface 104 to instantiate compute instances (and/or perform other operations using compute instances) using provider substrate extension resources in a manner analogous to the way in which such commands would be issued with respect to compute instances hosted within the cloud provider network 100. From the perspective of the customer, the customer can now seamlessly use local resources within a provider substrate extension (as well as resources located in the cloud provider network 100, if desired). The compute instances set up on a server at a provider substrate extension 102 may communicate both with electronic devices located in the same network as well as with other resources that are set up in the cloud provider network 100, as desired. A local gateway 146 can be implemented to provide network connectivity between a provider substrate extension 102 and a network associated with the extension (e.g., a communications service provider network in the example of a provider substrate extension 142).

There may be circumstances that necessitate the transfer of data between the object storage service and a provider substrate extension 102. For example, the object storage service may store machine images used to launch VMs, as well as snapshots representing point-in-time backups of volumes. The object gateway can be provided on a PSE server or a specialized storage device, and provide customers with configurable, per-bucket caching of object storage bucket contents in their PSE to minimize the impact of PSE-region latency on the customer's workloads. The object gateway can also temporarily store snapshot data from snapshots of volumes in the PSE and then sync with the object servers in the region when possible. The object gateway can also store machine images that the customer designates for use within the PSE or on the customer's premises. In some implementations, the data within the PSE may be encrypted with a unique key, and the cloud provider can limit keys from being shared from the region to the PSE for security reasons. Accordingly, data exchanged between the object store servers and the object gateway may utilize encryption, decryption, and/or re-encryption in order to preserve security boundaries with respect to encryption keys or other sensitive data. The transformation intermediary can perform these operations, and a PSE bucket can be created (on the object store servers) to store snapshot and machine image data using the PSE encryption key.

In the manner described above, a PSE 102 forms an edge location, in that it provides the resources and services of the cloud provider network outside of a traditional cloud provider data center and closer to customer devices. An edge location, as referred to herein, can be structured in several ways. In some implementations, an edge location can be an extension of the cloud provider network substrate including a limited quantity of capacity provided outside of an availability zone (e.g., in a small data center or other facility of the cloud provider that is located close to a customer workload and that may be distant from any availability zones). Such edge locations may be referred to as "local zones" (due to being relatively near to customer workloads). A local zone may be connected in various ways to a publicly accessible network such as the Internet, for example directly, via another network, or via a private connection to a region of the cloud provider network 100. Although typically a local zone would have more limited capacity than a region, in some cases a near zone may have substantial capacity, for example thousands of racks or more.

An edge location can include data plane capacity controlled at least partly by a control plane of a "nearby" availability zone of the provider network. As such, an availability zone group can include a "parent" availability zone (of a region) together with zero, one, or more "child" edge locations homed to (e.g., controlled at least partly by the control plane of) the parent availability zone. Certain limited control plane functionality (e.g., features that require low latency communication with customer resources, and/or features that enable the edge location to continue functioning when disconnected from the parent availability zone) may also be present in some edge locations, such as being implemented as control plan components 126.

Figure 2:
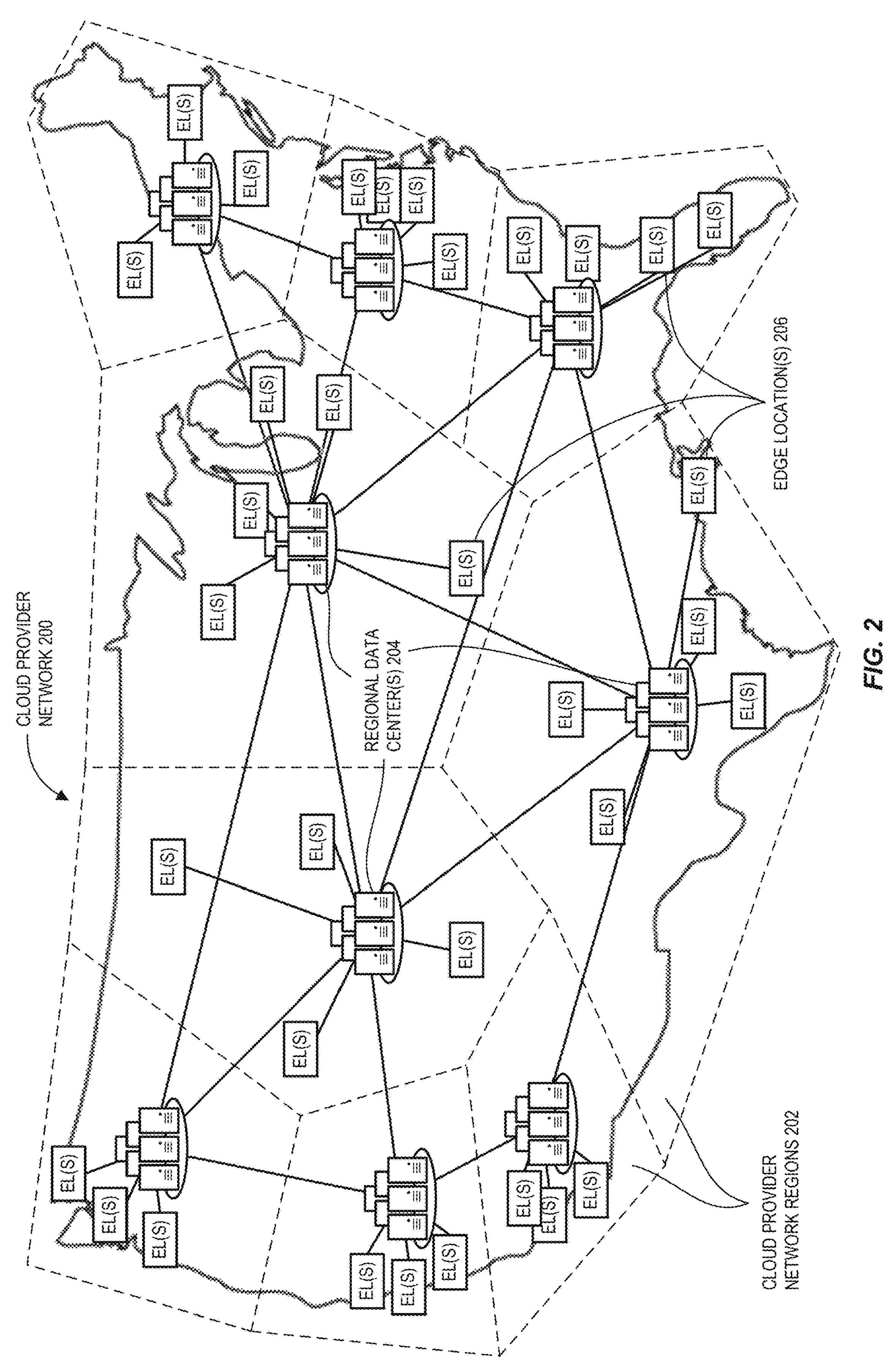
FIG. 2 illustrates an exemplary cloud provider network including geographically dispersed provider substrate extensions (or "edge locations") according to some examples.

For example, FIG. 2 illustrates an exemplary cloud provider network including geographically dispersed provider substrate extensions (or "edge locations") according to some examples. As illustrated, a cloud provider network 200 can be formed as a number of regions 202, where a region is a separate geographical area in which the cloud provider has one or more data centers 404. Each region 202 can include two or more availability zones (AZs) connected to one another via a private high-speed network such as, for example, a fiber communication connection. An AZ can refer to an isolated failure domain including one or more data center facilities with separate power, separate networking, and separate cooling relative to other availability zones. A cloud provider may strive to position availability zones within a region far enough away from one other such that a natural disaster, widespread power outage, or other unexpected event does not take more than one availability zone offline at the same time. Customers can connect to resources within availability zones of the cloud provider network via a publicly accessible network (e.g., the Internet, a cellular communication network, a CSP network). Transit Centers (TC) are the primary backbone locations linking customers to the cloud provider network and may be co-located at other network provider facilities (e.g., Internet service providers, telecommunications providers). Each region can operate two or more TCs for redundancy.

In comparison to the number of regional data centers or availability zones, the number of edge locations 206 can be much higher. Such widespread deployment of edge locations 206 can provide low-latency connectivity to the cloud for a much larger group of end user devices (in comparison to those that happen to be very close to a regional data center). In some examples, each edge location 206 can be peered to some portion of the cloud provider network 200 (e.g., a parent availability zone or regional data center). Such peering allows the various components operating in the cloud provider network 200 to manage the compute resources of the edge location. In some cases, multiple edge locations may be sited or installed in the same facility (e.g., separate racks of computer systems) and managed by different zones or data centers to provide additional redundancy. Note that although edge locations are typically depicted herein as within a CSP network, in some cases, such as when a cloud provider network facility is relatively close to a communications service provider facility, the edge location can remain within the physical premises of the cloud provider network while being connected to the communications service provider network via a fiber or other network link.

An edge location 206 can be structured in several ways. In some implementations, an edge location 206 can be an extension of the cloud provider network substrate including a limited quantity of capacity provided outside of an availability zone (e.g., in a small data center or other facility of the cloud provider that is located close to a customer workload and that may be distant from any availability zones). Such edge locations may be referred to as local zones, e.g., due to being more local or proximate to a group of users than traditional availability zones. A local zone may be connected in various ways to a publicly accessible network such as the Internet, for example directly, via another network, or via a private connection to a region. Although typically a local zone would have more limited capacity than a region, in some cases a local zone may have substantial capacity, for example thousands of racks or more. Some local zones may use similar infrastructure as typical cloud provider data centers or may use more specific edge location infrastructure.

One potential issue, however, with the use of provider substrate extensions arises due to the architectural arrangement of having most (or all) control decision-making and/or signaling coming from the cloud provider network 100. While this beneficially allows all (or most) of the computing resource availability of the oft-limited provider substrate extensions be utilized by customers (instead of being consumed by control-related components), this creates a path from these PSEs back into the cloud provider network, whereby the traffic may pass outside of the PSE and cloud, where it could potentially be subject to attack or interception/monitoring. Moreover, by having customer-controlled applications executed in a PSE but being able to communicate with the cloud provider network 100, the cloud provider network 100 itself could be making itself open to attack via this channel. Accordingly, to ensure the highest network security for both customers (who may have some of their traffic flow outside of the cloud provider network 100 and/or PSE 102) as well as for the cloud provider network 100 itself (which may receive potentially malicious traffic coming from these PSEs), it is crucial to protect this channel.

Accordingly, in some examples an architecture is used where no infrastructure secrets (e.g., VPC encryption keys used to encrypt traffic between instances in a VPC) are shared between a parent region and PSEs, and where traffic to and from a PSE can be inspected (e.g., the source and/or destinations are validated, among other possible checks) and potentially re-encrypted by an in-region entity. Moreover, in some examples, customer and substrate traffic flowing over the link (between a PSE and the cloud region) is encrypted while in-transit.

In some examples, this communication channel (or "link") between a PSE and the cloud region can be thought of as a "firewalled" parent-child link including a secure transport between the PSE and a parent region with secure transport endpoints in both locations. In some examples, this arrangement further includes a routing component in the parent region that can intelligently route different types of traffic to different destinations for validation, e.g., certain customer traffic can be sent to a first validation module (e.g., a fleet of instances) for mapping validation and re-encryption, certain types of control traffic (e.g., CoAP, DNS, KMS, etc.) to a second validation module for validation (and optionally, proxying), and/or a type of traffic to a set of secure service siblings for processing, among many other possibilities. Accordingly, a comparatively "low-trust" PSE can be safely allowed to interoperate with a "high-trust" region of a cloud provider network where correct behavior can be enforced.

As used herein, the term "validation" may be used to refer to performing a set of one or more "checks" or tests involving traffic that aim to identify whether the traffic is legitimate, as opposed to being illegitimate, unauthorized, malicious, or the like. Many possible validation checks can be implemented based on the particular context of use, type of traffic involved, and the like, and may include determining whether a source of the traffic is a known "speaker" and is speaking to a resource that it has an authorized or observed relationship with. For example, validation checks could include determining whether a source network address appears legitimate (e.g., is within a particular address range, such as within a range known to be used in a particular network or subnet, or is known to be in use), determining whether a destination network address appears legitimate, determining whether a combination of both a source network address and a destination address is legitimate (e.g., via determining that the two have communicated previously, that the two are authorized to communicate, etc.), determining whether a token or credential associated with the traffic appears to be legitimate (e.g., corresponds to a source of the traffic), determining whether a type of request carried in the traffic is expected or has been seen/used before in a particular context, determining whether a source of the traffic is known to exist (e.g., within a particular location or network segment), determining whether there is a previous control plane designated relationship between a source and a destination (e.g., as evidenced by a command or response seen in the control plane), etc. Thus, unless otherwise indicated by the context of use, the term validation is to be broadly construed to cover various types or combinations of analysis performed, involving network traffic, to seek to determine if some aspect(s) of the traffic appears or does not appear to be legitimate.

Figure 3:
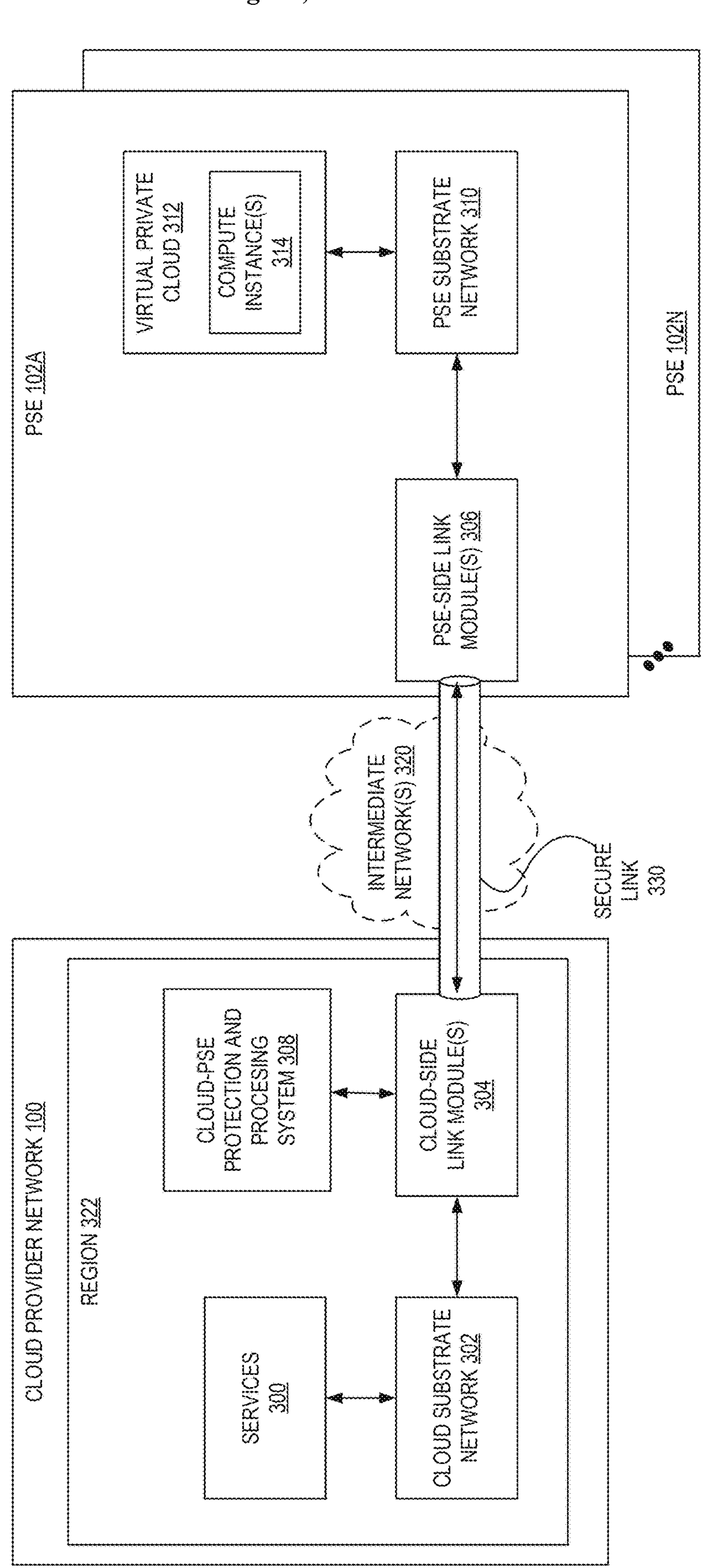
FIG. 3 illustrates an exemplary architecture utilizing a cloud-side link module and a provider substrate extension-side link module to secure a communications channel between a cloud provider network and a provider substrate extension according to some examples.

For example, FIG. 3 illustrates an exemplary architecture utilizing a cloud-side link module and a provider substrate extension-side link to secure a communications channel between a cloud provider network and a provider substrate extension according to some examples. As shown, a pair of link modules—here shown as a link module 304 and a PSE-side link module 306—are deployed in a region of a cloud provider network 100 and a PSE 104A, respectively, as part of implementing a firewalled secure link between the two. These link modules 304, 306 can be implemented as software executed by one or more computing devices and may include one or multiple applications that collectively form the link module.

Accordingly, as shown, a computing device hosting a compute instance 314 of a customer (e.g., operating as part of a virtual private cloud 312) can securely communicate with one or more services 300 that are "in-region" within a cloud provider network 100, whether it be with "data plane" type traffic sent to another compute instance of that customer (e.g., via a hardware virtualization service or similar managed compute service) or a standalone service (e.g., a machine learning service, as one of many possibilities), or via "control plane" type traffic destined to control plane components of the cloud provider network 100.

For example, messages can be originated by a compute instance 314 that are sent, by its underlying host computing device, via PSE substrate network 310 toward an endpoint of (or associated with) a PSE-side link 306. Some or all of these messages (e.g., a payload of the message) may be encrypted using an encryption scheme that is common across the particular PSE, or specific to the particular virtual private cloud 312 or customer. For example, symmetric key encryption can be used for messages involving compute instances of a particular virtual private cloud.

A virtual private cloud (VPC) (also referred to as a virtual network (VNet), virtual private network, or virtual cloud network, in various implementations) is a custom-defined, virtual network within another network, such as a cloud provider network. A VPC can be defined by at least its address space, internal structure (e.g., the computing resources that comprise the VPC, security groups), and transit paths, and is logically isolated from other virtual networks in the cloud. A VPC can span all of the availability zones in a particular region.

A VPC can provide the foundational network layer for a cloud service, for example a compute cloud or an edge cloud, or for a customer application or workload that runs on the cloud. A VPC can be dedicated to a particular customer account (or set of related customer accounts, such as different customer accounts belonging to the same business organization). Customers can launch resources, such as compute instances, into their VPC(s). When creating a VPC, a customer can specify a range of IP addresses for the VPC in the form of a Classless Inter-Domain Routing (CIDR) block. After creating a VPC, a customer can add one or more subnets in each availability zone or edge location associated with its region.

In some examples, traffic (e.g., a payload of traffic) sent by a compute instance 314 is thus encrypted using an encryption scheme, and when destined to the cloud provider network 100, is sent via the PSE substrate network 310 to a PSE-side link module 306. The PSE-side link module 306 may decrypt this payload due to its awareness of the encryption scheme, e.g., by using a common symmetric encryption key that is used to encrypt and decrypt this traffic of this particular VPC 312. In some examples, the PSE-side link module 306 can validate this traffic, e.g., ensure that it is of an allowed type of traffic, that it is from an instance 314 that it knows belongs to the VPC 312 or is known to be hosted in the PSE 102A, that it belongs to an acceptable destination, etc. If the validation fails, perhaps due to some sort of malicious activity, this traffic can be dropped or otherwise refused, alert messages can be generated (e.g., sent to the customer and/or an administrator associated with the customer or the cloud provider network 100), etc.

The PSE-side link module 316 may then re-encrypt this request (or traffic) using a separate encryption scheme—e.g., via use of a separate symmetric key that is shared between only that PSE-side link module 306 and a corresponding link module 304 of the "parent" region 322 or AZ for the PSE 102A. In this manner, the encryption scheme used in the VPC 312 is thus separated from the encryption scheme used to access the region 322 of the cloud provider network 100. This beneficially eliminates an attack vector leading into region 322 should the VPC 312 encryption scheme be compromised.

This encrypted traffic can itself be sent over a secure link 330, which itself may be encrypted (using another encryption scheme, such as a secure tunnel protocol known to those of skill in the art) and potentially be implemented over one or more intermediate networks 320, which may or may not include the public internet. This secure link 330 can be terminated by the link module 304, which removes the secure link encryption (e.g., by decrypting the traffic), and then can further remove the region-to-PSE encryption, e.g., by decrypting using the shared symmetric key known to the particular PSE-side link module 306 and the link module 304.

At this point, the link module 304 can provider further "firewall" functionalities for this channel, e.g., by routing the traffic based on its type to a particular validation and/or processing destination. In some examples, the link module 304 may validate the traffic itself—such as by ensuring that the traffic properly adheres to a particular protocol—and passes it via the cloud substrate network 302 to a destination provided by one of the services 300, whether it be a service endpoint (for receiving API requests), a customer compute instance (e.g., hosted by a hardware virtualization service), or the like.

In some examples, another type of traffic—such as a type of control plane traffic—may be routed by the link module 304 to a cloud-PSE protection and processing system 308 for validation and/or processing. For example, certain types of control plane traffic can be sent to a particular module of the cloud-PSE protection and processing system 308 to be validated, such as by ensuring that an originating (or destination) compute instance is known (e.g., via a data structure lookup) to be within the VPC and/or PSE 102A where the traffic originated, that a stated instance or network address is known to be valid and in-use within the VPC 312 and/or PSE 140A, or many other validations known to those of skill in the art, etc. Thus, this validation process can provide "firewall" type functionalities to help ensure that traffic received from (and/or destined to) a PSE appears to be valid and proper, thus eliminating many types of exploratory or malicious traffic that could be been originated therein. For example, traffic that fails a validation here can be dropped, alert messages can be transmitted, etc., to alert certain individuals, cause automated responses to be executed, etc. In some examples, after validation, the involved modules of the cloud-PSE protection and processing system 308 may potentially act as a proxy for the originating compute instance, thus sending the request toward the eventual destination (e.g., service(s) 300) via the link module 304 as the cloud-PSE protection and processing system 308 itself may not have connectivity to the cloud substrate network 302 (to again provide the cloud substrate network 302 with additional security).

Additionally, or alternatively, the link module 304 may route certain types of traffic (e.g., destinated to a particular service or network address, or using a particular protocol or identifier, etc.) to a module of the cloud-PSE protection and processing system 308 that may act on behalf of the actual service. For example, such a module may be a "secure service sibling" of a service in the form of a more limited instantiation of the service itself, but within the cloud-PSE protection and processing system 308 instead of within services 300. In one example, this could be in the form of one or more compute instances that are adapted to process a particular set of requests from the PSEs 102 (or send a particular type of requests to the PSEs) instead of having the services 300 themselves perform these operations. This can protect the services 300 by shifting potentially malicious traffic to be processed in a more constrained, limited environment provided by the cloud-PSE protection and processing system 308, which may not need access to other sensitive systems, data, or functionalities.

Figure 4:
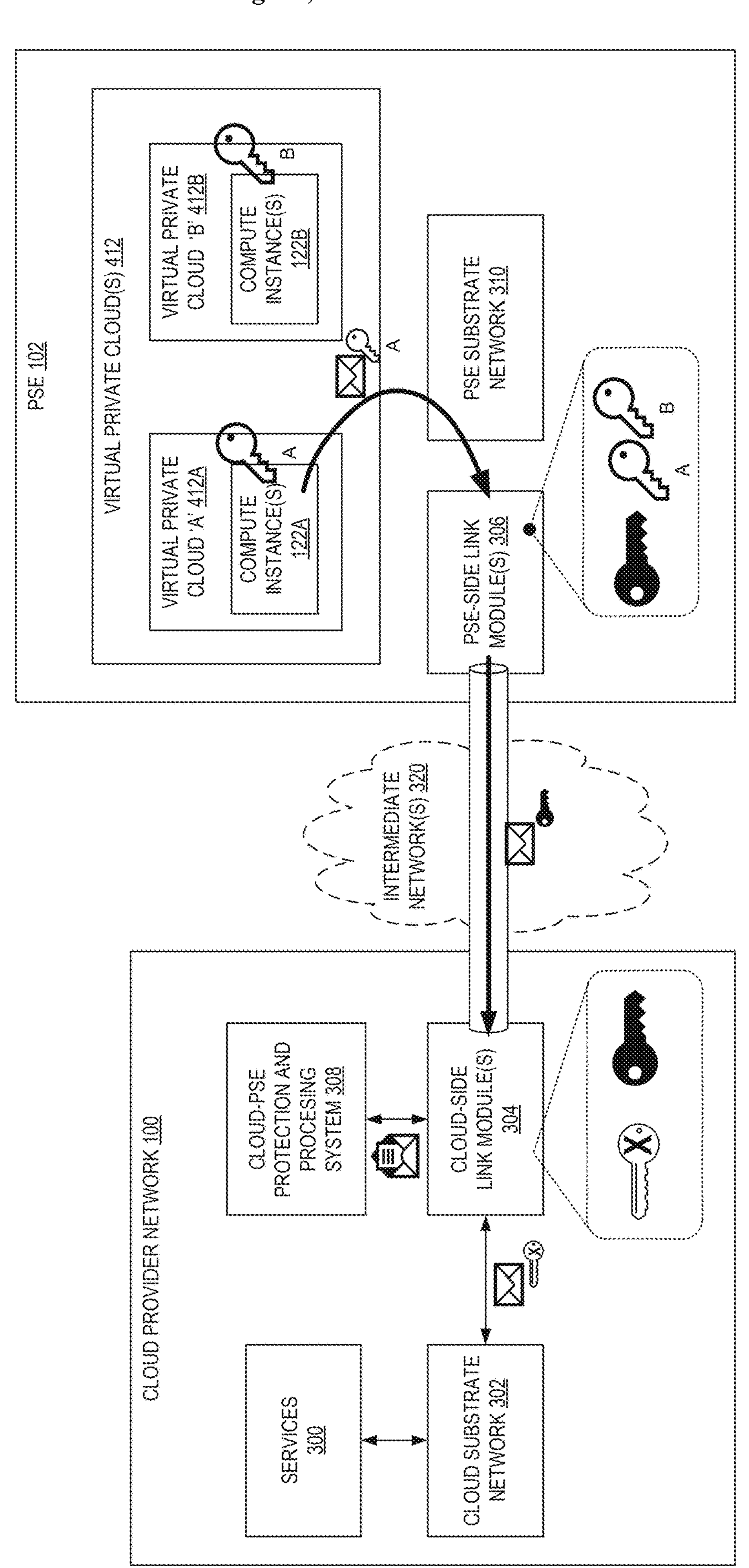
FIG. 4 illustrates an exemplary constrained encryption approach for implementing a cloud-side link module and a provider substrate extension-side link module to secure a communications channel between a cloud provider network and a provider substrate extension according to some examples.

For further understanding, FIG. 4 illustrates an exemplary constrained encryption approach for implementing a cloud-side link module 304 and a provider substrate extension-side link module 306 to secure a communications channel between a cloud provider network and a provider substrate extension according to some examples. As shown, different compute instances 122A-122B are illustrated as operating within different virtual private clouds 412A-412B. In this example, each of the virtual private clouds 412A-412B has its own encryption scheme—here, a common protocol but each using a different encryption key (or set of keys) to encrypt traffic. For example, a payload of a message sent by one of the compute instances 122A in VPC 'A' 412A can be encrypted using a first key 'A', where a header is attached to the encrypted payload and thus used to route the traffic. In some examples, this entire message can be additionally encrypted, e.g., using a TLS or SSL type approach.

When a destination for the message is within the cloud provider network 100, the message is directed to the PSE-side link module 306, for example, via configuring the virtual private cloud 412A (and/or the PSE substrate network 310) to send non-matching routes (or specific routes) to the PSE-side link module 306. Thus, this message—which may have multiple levels of encryption, but most notably including a layer of encryption via use of a VPC-specific key 'A'—is provided to the PSE-side link module 306.

The PSE-side link module 306, in this architecture, is provided with access to the various VPC encryption keys that may be in use—here, shown with keys 'A' and 'B' for VPCs 'A' 412A and 'B' 412B. However, in other configurations, perhaps only one such key is used for multiple VPCs, or one used for all resources of a common customer, or more keys may be used (e.g., which may be specific to an instance, range of network addresses, subnet, etc.). Alternatively, other types of encryption can be used, provided that the PSE-side link module 306 can decrypt this traffic.

The PSE-side link module 306 may then encrypt this traffic (or portion thereof, such as the payload) via use of another encryption scheme—here, via use of a shared symmetric key (illustrated in solid black) that the PSE-side link module 306 and cloud-side link module 304 both have access to. This encrypted traffic can be sent via the secure tunnel, for example, as a payload that is combined with other headers, some or all of which may again be encrypted using a TLS, SSL, or similar encryption technique.

This secure tunnel is terminated at the cloud-side link module 304 (e.g., the TLS or SSL encryption is decrypted) leaving zero, one, or more headers and the encrypted payload. This encrypted portion can be decrypted by the cloud-side link module 304 using the shared symmetric key and routed for subsequent processing—whether validation is done by a validation module of the link module 304, the cloud-PSE protection and processing system 308, or the services 300. In some examples, this may further include use of a cloud substrate network 302 (or service-specific) key, illustrated with a key having an 'X' thereupon, to encrypt the message to be sent to a service 300 or other destination.

Accordingly, the messages are encrypted-in-transit at all beneficial points in time, and the use of separate encryption schemes protects the PSE and the cloud provider network 100 in case a key from the other is compromised. Further, as a keypair (or key) used by the cloud-side link module 304 and PSE-side link module 306 is specific to those entities—and thus multiple such keys (or pairs) exist for a link module 304 its "children" PSEs 102A-102N, one such compromise of a key again limits the blast radius of harm as the keys are not used more widely.

While this figure demonstrates traffic flowing from the PSE 102 to the cloud provider network 100, it is to be appreciated that the reverse direction can also be supported with similar, though reverse, operations.

Figure 5:
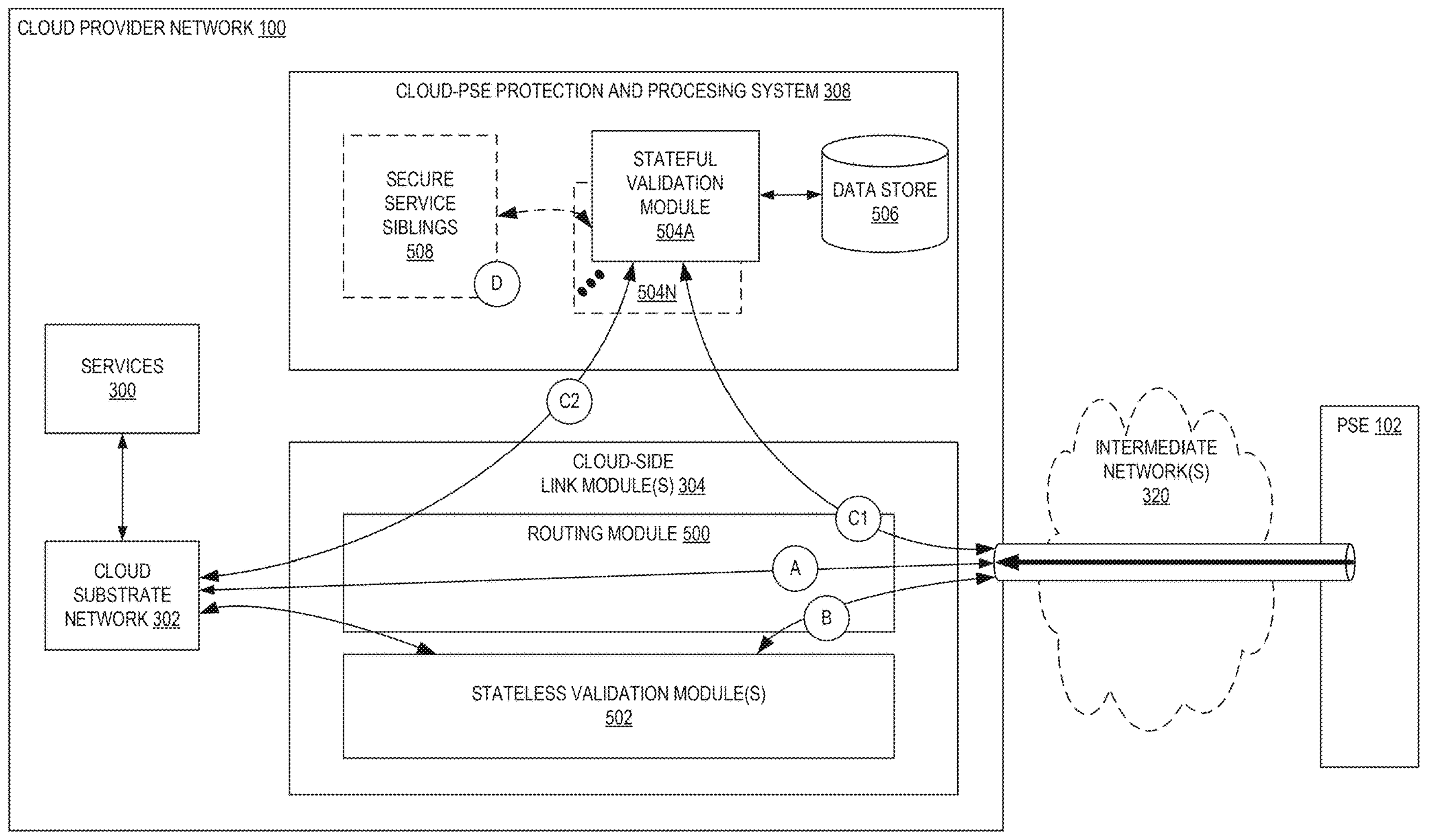
FIG. 5 illustrates an exemplary cloud-PSE protection and processing system and its use in implementing a secure communications channel between a cloud provider network and a provider substrate extension according to some examples.

FIG. 5 illustrates an exemplary cloud-PSE protection and processing system and its use in implementing a secure communications channel between a cloud provider network and a provider substrate extension according to some examples. As shown, in some examples the cloud-side link module(s) 304 can include a routing module 500 and optionally one or more stateless validation modules 502. The routing module 500 can be utilized to determine where received traffic (from or to a PSE 102) is to be sent based on characteristics of the network traffic. For example, as illustrated with reference to circle (A), it may be the case that traffic from the PSE 102 can be directly sent via the cloud substrate network 302 to an entity of (or hosted by) a service 300, such as an API endpoint of a service, a compute instance of a service, or the like. This configuration, in some examples, could be used for certain classes of data plane type traffic that are identifiable by the routing module 500 (e.g., based on values in the traffic), such as calls originated by compute instances in a PSE 102 to a particular service 300, particular types of API calls, specified destinations, protocol types, specific values in specific OSI layers of the traffic, or the like.

In some examples, as reflected by circle (B), some types of traffic can be "locally" validated by one or more validation modules 502, which may optionally be stateless in that they would not need any "state" or previous knowledge of the traffic. Thus, traffic that is received at the routing module 500 can be identified that should be sent to the optionally one or more stateless validation modules 502, which can validate the correctness and/or legitimacy of the traffic according to a set of rules or tests. For example, a "correctness" of a particular type of traffic (e.g., DNS requests) can be verified by determining that the request is well-formed, that it is destined to an appropriate destination, that certain fields satisfy some criteria, or the like. If not, the traffic may be dropped, alerts may be generated, etc., but if the validation passes, the traffic can be sent on via the cloud substrate network 302 on to the destination (provided by services 300). In some examples, the one or more stateless validation modules 502 may act as a proxy in this configuration, and thus originate a new request to the destination (on behalf of the originator of the traffic), and ultimate return any response back to the originator.

Additionally, or alternatively, in some examples particular types of traffic—such as control plane traffic—can be identified by the routing module 500 (e.g., using a flag set in the traffic, using a protocol identified in the traffic, etc.) and sent, as shown via circle (C1), to a stateful validation module 504A. This can involve, by the routing module 500, selecting a particular stateful validation module 504A from potentially multiple stateful validation modules 504A-504N based on an analysis of the traffic, as each may be configured to validate a particular type of traffic. This validation may, in whole or in part, be stateful in that it uses information from a data store 506 (e.g., one or more databases, data structures, directories, catalogs, remote services, or the like) to determine if the traffic is valid. For example, the routing module 500 may identify DHCP traffic based on inspecting the messages and select a stateful validation module 504A known to validate DHCP traffic.

As one example, the determination may involve determining whether the traffic is arriving from a PSE 102 that exists, is arriving from a VPC that is known to exist in that particular VPC, is arriving from a particular server computing device that is known to exist in that PSE 102, is coming from a compute instance that is known to exist in that PSE 102 and/or VPC, etc. To perform these checks, various information about the state of the cloud provider network 100 and/or PSEs 102 may be referenced. As an additional example, particular credentials or tokens passed with (or in) the traffic can be examined and validated to ensure that they are correct and/or correspond to a particular originating client, compute instance, physical host device, VPC, and/or PSE 102. As yet another example, similar information regarding a destination of the traffic can be checked, e.g., to ensure that the destination is known to be a recipient of that type of traffic, that the destination exists, etc.

As described elsewhere herein, if the validation checks fail, a variety of responsive actions can be performed, such as dropping the traffic, generating an alert or message/notification, causing the traffic to be analyzed in depth, causing the traffic to be stored for later analysis, etc. Otherwise, the traffic may be further processed.

In some examples, ones of the stateful validation modules 504 may act as proxies for the traffic that they validate, issuing new requests as reflected via circle (C2) on via the link module 304 through the cloud substrate network 302 to the destination, as provided via services 300, where responses will be returned to the proxy and then ultimately back to the originator. Alternatively, in some examples, ones of the stateful validation modules 504 may instead be configured to send the traffic to a secure service sibling 508 as reflected by circle (D).

Though in this example, there exists one or more stateless validation modules 502 in the cloud-side link modules 304 and one or more stateful validation modules 504A-504N in the cloud-PSE protection and processing system 308, it is to be understood that this configuration is simply one possible deployment arrangement and that the checks/tests performed by any of these modules in any of these locations may be stateless, stateful, or a combination of both.

A secure service sibling 508, as introduced earlier herein, can be an application that implements some or all functionality of a corresponding service 300. For example, the secure service sibling 508 may be able to process some number or type of API requests that the corresponding service 300 can, possibly using the exact same logic/code as the service itself. Thus, in some examples, one or more secure service sibling 508 are purposefully deployed into the cloud-PSE protection and processing system 308, e.g., such as by launching particular compute instances based on images, and the routing module 500 can be adapted to identify particular requests destined to particular services 300, and instead cause them to be re-routed either directly to a secure service sibling 508 or indirectly (via first being process by a stateful validation module 504, and possibly thereafter being proxied and sent to the secure service sibling 508). In this manner, potentially malicious traffic can be limited to accessing the secure service sibling 508 environment without needing access to the cloud's cloud substrate network 302 or services 300 themselves, thereby protecting the cloud provider network 100. Additionally, or alternatively, certain types of "simple" traffic can thus be processed by the secure service sibling 508, offloading this work from the service 300 itself, reducing its load and providing increased security for its operation in not needing to be exposed to traffic from comparatively lower-trust environments such as PSEs. In some examples, a secure service sibling 508 can be implemented as a same entity or component as a stateful validation module 504, where the stateful validation module 504 could potentially be implemented using some code or modules to perform validation(s), and when this validation succeeds, other code or modules making up the secure service sibling 508 can process the traffic.

Further, in some examples, one or more of the routing module 500, stateful validation modules 504, one or more stateless validation modules 502, and/or secure service siblings 508 may include rate limiting functionalities to further protect the operation of the cloud provider network 100. These rate limiting functionalities can be customized for particular types, origins, destinations, etc., of traffic, or for all traffic. The rate limiting functionalities can thus control the number of requests a caller (or set of callers) can make to a service within a specified time frame, preventing abuse and ensuring fair resource distribution. In some examples, the rate limiting functionalities work by tracking the number of requests of a particular type (e.g., from a particular user, involving a particular service, etc.) and blocking or delaying requests that exceed the allowed limit.

While this figure demonstrates traffic flowing from the PSE 102 to the cloud provider network 100 and toward various destinations, it is to be appreciated that the reverse direction can also be supported with similar, though reverse, operations.

Figure 6:
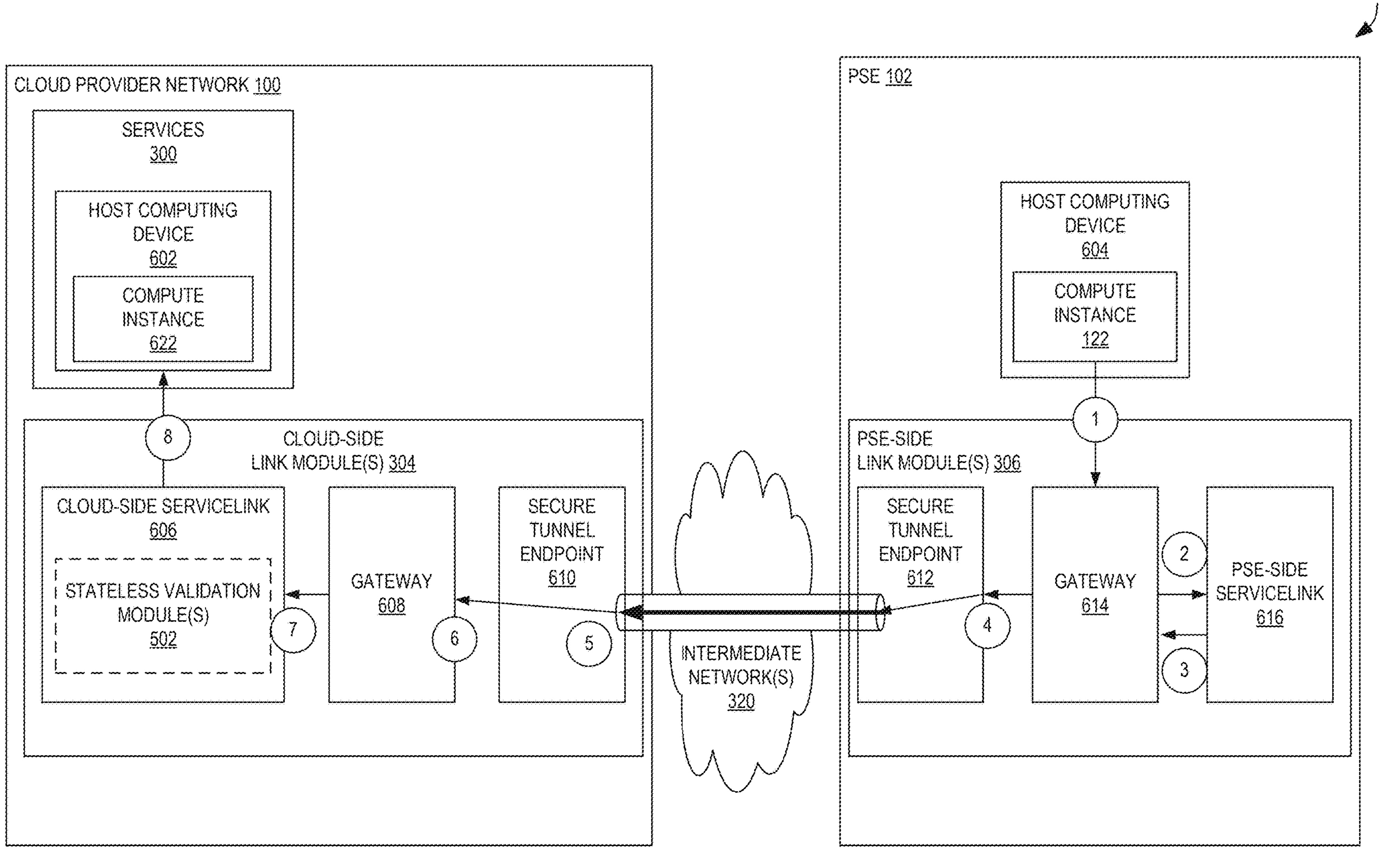
FIG. 6 illustrates an exemplary system employing a secure communications channel for communications between compute instances in a provider substrate extension and a cloud provider network according to some examples.

As shown by circle (A), in some examples it may be the case that some traffic can be directly passed on to a destination via the cloud substrate network 302. For further detail, FIG. 6 illustrates an exemplary system 600 employing a secure communications channel for communications between compute instances in a provider substrate extension and a cloud provider network according to some examples. In this example, a detailed traffic path for traffic originating at a compute instance 122 in a PSE 102 and destined to compute instance 622 is shown, though it is to be understood that similar operations would be involved for traffic originated by compute instance 622 and destined to compute instance 122.

As shown with reference to circle (1), traffic leaving a compute instance 122 is sent by its host computing device 604 to a gateway 614 (which may be implemented via a fleet of one or multiple compute instances, e.g., to couple different network segments or address spaces), where a default route out of the PSE 102 is advertised as being provided via this internet gateway 614. Thus, any traffic sent by compute instance 122 that is not sent to something local to the PSE 102, whether that be an internet address or an in-region substrate address (e.g., associated with compute instance 622), will be sent there. In this case, we assume the traffic is traffic sent from one host computing device 604 in the provider substrate extension 102 to another host computing device 602 in-region and will be encrypted by the device 604 using a VPC encryption key, as described herein, which may be specific to each VPC in the PSE 102 or used across all VPCs in the PSE 102.

At circle (2), the internet gateway 614 can classify and forward any region-bound packet to a PSE-side servicelink 616. At this point, there may be no decryption of the original packet by internet gateway 614 at this stage.

The PSE-side servicelink 616, then, can decrypt the packet using the VPC encryption key, perform a mapping lookup to validate the sender, determine the destination details (e.g., the in-region device 602), and perform a route lookup to determine the AZ of the destination subnet in the parent region. The PSE-side servicelink 616 may then encrypt the packet using a different symmetric key, specific to this pair of the PSE-side link module 306 and link module 304 of the parent region. In some examples, the PSE-side servicelink 616 may further add additional headers to the traffic, e.g., an outer IP header that is addressed to the relevant AZ secure tunnel endpoint 610 or similar entity. The PSE-side servicelink 616 may then transmit the packet back to the internet gateway 614 at circle (3).

Upon reception, the internet gateway 614 may determine that the inner packet is destined to an address in the cloud provider network 100, pop the outer header off, and forward the traffic back out via a secure tunnel endpoint 612 across one or more intermediate networks 320, which could be a private backhaul network, the public internet, etc.

The packet may be received at relevant AZ secure tunnel endpoint 610 at circle (5) and provided to a gateway 608 at circle (6), which knows that the packet arrived from the provider substrate extension 102 and sends it to the cloud-side servicelink 606 component at circle (7).

The cloud-side servicelink 606, via one or more stateless validation modules 502, can validate headers of the packet and decrypt the payload using the same symmetric key that was used for encryption by the PSE-side servicelink 616. In some examples, a mapping lookup can be performed (e.g., by a stateless validation module 502) to validate the destination, and the packet can be encrypted by the cloud-side servicelink 606, e.g., using an encryption key associated with a VPC of the destination compute instance 622, with all VPCs of the AZ or region, etc. Thus, in some examples, the original packet that had been sent by the host computing device 604 in the provider substrate extension 102, identical except in its encryption having been pivoted from PSE 102 to cloud provider network 100 keys, will be sent via the substrate network and on to the destination.

FIG. 7 is a flow diagram illustrating computer-implemented operations 700 of a method for utilizing a secure communications link between a cloud provider network and a provider substrate extension according to some examples. Some or all of the operations 700 (or other processes described herein, or variations, and/or combinations thereof) are performed under the control of one or more computing devices configured with executable instructions, and are implemented as code (e.g., executable instructions, one or more computer programs, or one or more applications) executing collectively on one or more processors. The code is stored on a computer-readable storage medium, for example, in the form of a computer program comprising instructions executable by one or more processors. The computer-readable storage medium is non-transitory. In some examples, one or more (or all) of the operations 700 are performed by the cloud-side link module 304 and/or PSE-side link module 306 of the other figures.

The operations 700 include, at block 702, receiving, at a first link module deployed in a provider substrate extension of a cloud provider network, a first encrypted request destined to a service operated within the cloud provider network, wherein the first encrypted request was originated by a compute instance of a user that operates within a virtual private cloud of the user, wherein the compute instance is hosted in the provider substrate extension, and wherein the first encrypted request was encrypted via use of an encryption scheme that encrypts traffic of the virtual private cloud. The operations 700 further include, at block 704, decrypting, by the first link module, the first encrypted request to yield a request, and at block 706, encrypting, by the first link module, the request using a separate encryption scheme that encrypts traffic between the provider substrate extension and the cloud provider network to yield a second encrypted request. At block 708, the operations 700 also include transmitting, by the first link module, the second encrypted request to a second link module deployed in the cloud provider network.

Figure 8:
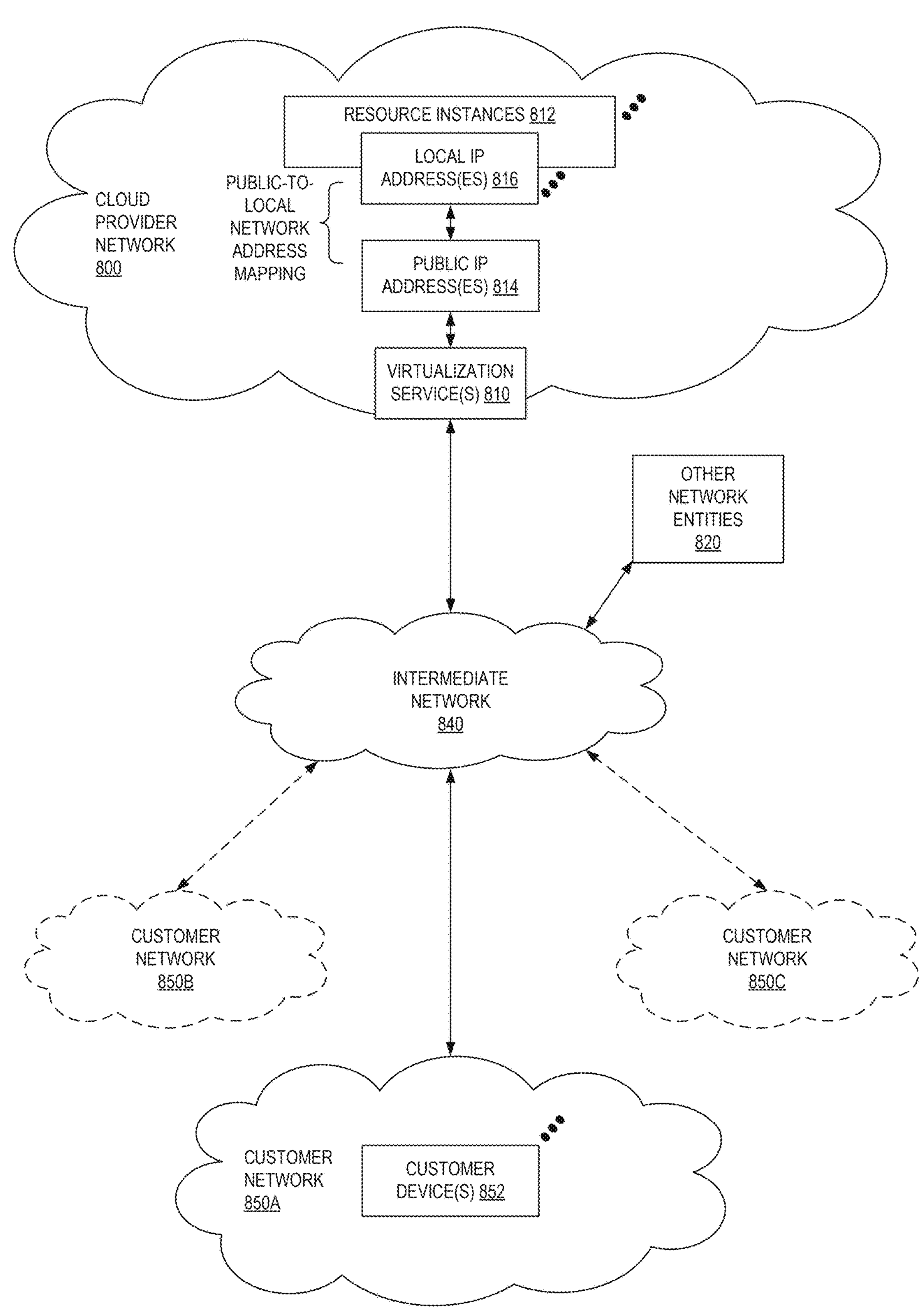
FIG. 8 illustrates an example cloud provider network environment according to some examples.

FIG. 8 illustrates an example provider network (or "service provider system") environment according to some examples. A provider network 800 can provide resource virtualization to customers via one or more virtualization services 810 that allow customers to purchase, rent, or otherwise obtain instances 812 of virtualized resources, including but not limited to computation and storage resources, implemented on devices within the provider network or networks in one or more data centers. Local Internet Protocol (IP) addresses 816 can be associated with the resource instances 812; the local IP addresses are the internal network addresses of the resource instances 812 on the provider network 800. In some examples, the provider network 800 can also provide public IP addresses 814 and/or public IP address ranges (e.g., Internet Protocol version 4 (IPv4) or Internet Protocol version 6 (IPv6) addresses) that customers can obtain from the provider 800.

Conventionally, the provider network 800, via the virtualization services 810, can allow a customer of the service provider (e.g., a customer that operates one or more customer networks 850A-850C (or "client networks") including one or more customer device(s) 852) to dynamically associate at least some public IP addresses 814 assigned or allocated to the customer with particular resource instances 812 assigned to the customer. The provider network 800 can also allow the customer to remap a public IP address 814, previously mapped to one virtualized computing resource instance 812 allocated to the customer, to another virtualized computing resource instance 812 that is also allocated to the customer. Using the virtualized computing resource instances 812 and public IP addresses 814 provided by the service provider, a customer of the service provider such as the operator of the customer network(s) 850A-850C can, for example, implement customer-specific applications and present the customer's applications on an intermediate network 840, such as the Internet. Other network entities 820 on the intermediate network 840 can then generate traffic to a destination public IP address 814 published by the customer network(s) 850A-850C; the traffic is routed to the service provider data center, and at the data center is routed, via a network substrate, to the local IP address 816 of the virtualized computing resource instance 812 currently mapped to the destination public IP address 814. Similarly, response traffic from the virtualized computing resource instance 812 can be routed via the network substrate back onto the intermediate network 840 to the source entity 820.

Local IP addresses, as used herein, refer to the internal or "private" network addresses, for example, of resource instances in a provider network. Local IP addresses can be within address blocks reserved by Internet Engineering Task Force (IETF) Request for Comments (RFC) 1918 and/or of an address format specified by IETF RFC 4193 and can be mutable within the provider network. Network traffic originating outside the provider network is not directly routed to local IP addresses; instead, the traffic uses public IP addresses that are mapped to the local IP addresses of the resource instances. The provider network can include networking devices or appliances that provide network address translation (NAT) or similar functionality to perform the mapping from public IP addresses to local IP addresses and vice versa.

Public IP addresses are Internet mutable network addresses that are assigned to resource instances, either by the service provider or by the customer. Traffic routed to a public IP address is translated, for example via 1:1 NAT, and forwarded to the respective local IP address of a resource instance.

Some public IP addresses can be assigned by the provider network infrastructure to particular resource instances; these public IP addresses can be referred to as standard public IP addresses, or simply standard IP addresses. In some examples, the mapping of a standard IP address to a local IP address of a resource instance is the default launch configuration for all resource instance types.

At least some public IP addresses can be allocated to or obtained by customers of the provider network 800; a customer can then assign their allocated public IP addresses to particular resource instances allocated to the customer. These public IP addresses can be referred to as customer public IP addresses, or simply customer IP addresses. Instead of being assigned by the provider network 800 to resource instances as in the case of standard IP addresses, customer IP addresses can be assigned to resource instances by the customers, for example via an API provided by the service provider. Unlike standard IP addresses, customer IP addresses are allocated to customer accounts and can be remapped to other resource instances by the respective customers as necessary or desired. A customer IP address is associated with a customer's account, not a particular resource instance, and the customer controls that IP address until the customer chooses to release it. Unlike conventional static IP addresses, customer IP addresses allow the customer to mask resource instance or availability zone failures by remapping the customer's public IP addresses to any resource instance associated with the customer's account. The customer IP addresses, for example, enable a customer to engineer around problems with the customer's resource instances or software by remapping customer IP addresses to replacement resource instances.

Figure 9:
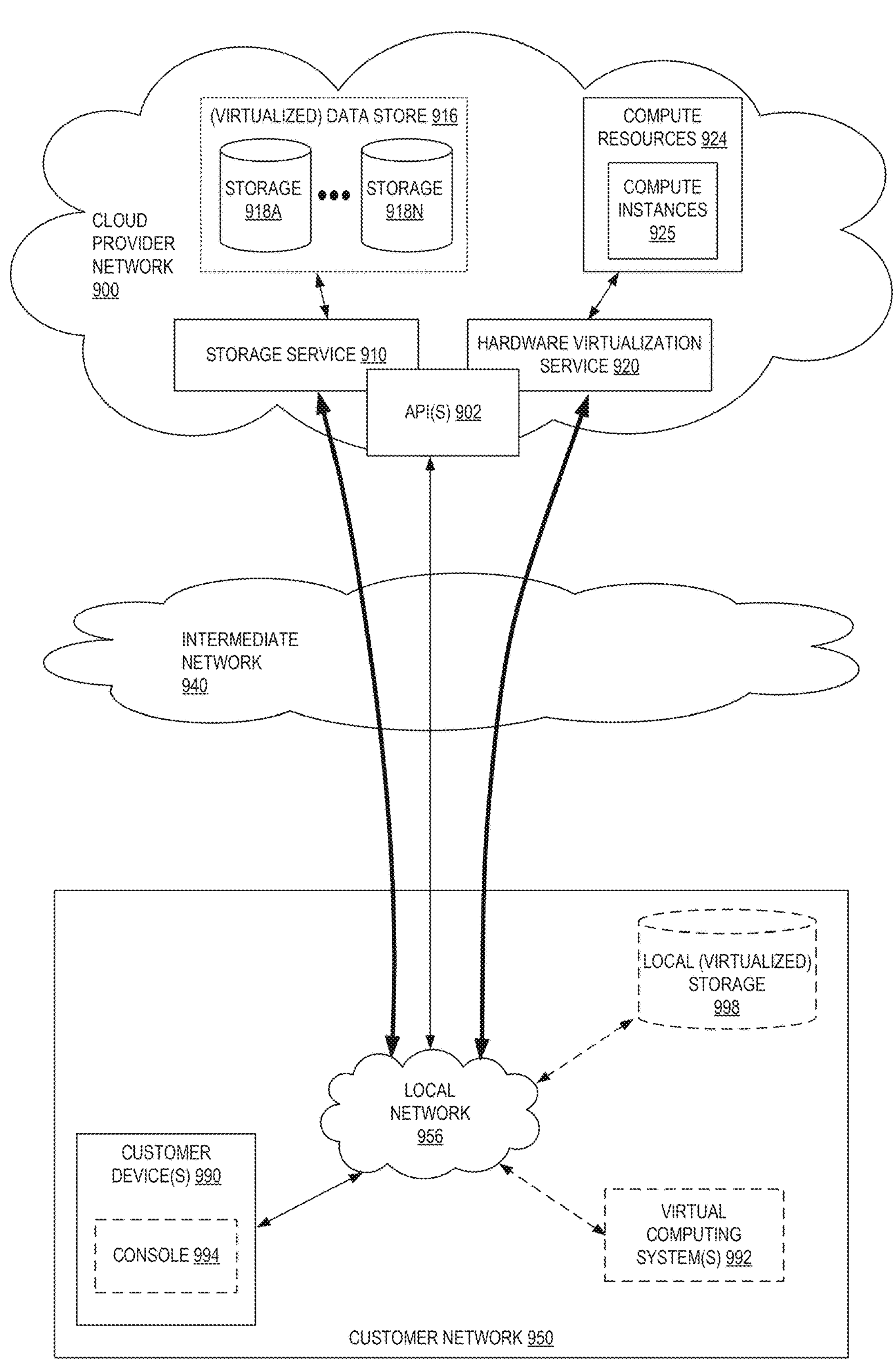
FIG. 9 is a block diagram of an example cloud provider network that provides a storage service and a hardware virtualization service to users according to some examples.

FIG. 9 is a block diagram of an example provider network environment that provides a storage service and a hardware virtualization service to users, according to some examples. A hardware virtualization service 920 provides multiple compute resources 924 (e.g., compute instances 925, such as VMs) to users. The compute resources 924 can, for example, be provided as a service to users (or "customers") of a provider network 900 (e.g., to a customer that implements a customer network 950). Each computation resource 924 can be provided with one or more local IP addresses. The provider network 900 can be configured to route packets from the local IP addresses of the compute resources 924 to public Internet destinations, and from public Internet sources to the local IP addresses of the compute resources 924.

The provider network 900 can provide the customer network 950, for example coupled to an intermediate network 940 via a local network 956, the ability to implement virtual computing systems 992 via the hardware virtualization service 920 coupled to the intermediate network 940 and to the provider network 900. In some examples, the hardware virtualization service 920 can provide one or more APIs 902, for example a web services interface, via which the customer network 950 can access functionality provided by the hardware virtualization service 920, for example via a console 994 (e.g., a web-based application, standalone application, mobile application, etc.) of a customer device 990. In some examples, at the provider network 900, each virtual computing system 992 at the customer network 950 can correspond to a computation resource 924 that is leased, rented, or otherwise provided to the customer network 950.

From an instance of the virtual computing system(s) 992 and/or another customer device 990 (e.g., via console 994), the customer can access the functionality of a storage service 910, for example via the one or more APIs 902, to access data from and store data to storage resources 918A-918N of a virtual data store 916 (e.g., a folder or "bucket," a virtualized volume, a database, etc.) provided by the provider network 900. In some examples, a virtualized data store gateway (not shown) can be provided at the customer network 950 that can locally cache at least some data, for example frequently accessed or critical data, and that can communicate with the storage service 910 via one or more communications channels to upload new or modified data from a local cache so that the primary store of data (the virtualized data store 916) is maintained. In some examples, a user, via the virtual computing system 992 and/or another customer device 990, can mount and access virtual data store 916 volumes via the storage service 910 acting as a storage virtualization service, and these volumes can appear to the user as local (virtualized) storage 998.

While not shown in FIG. 9, the virtualization service(s) can also be accessed from resource instances within the provider network 900 via the API(s) 902. For example, a customer, appliance service provider, or other entity can access a virtualization service from within a respective virtual network on the provider network 900 via the API(s) 902 to request allocation of one or more resource instances within the virtual network or within another virtual network.

Illustrative Systems

Figure 10:
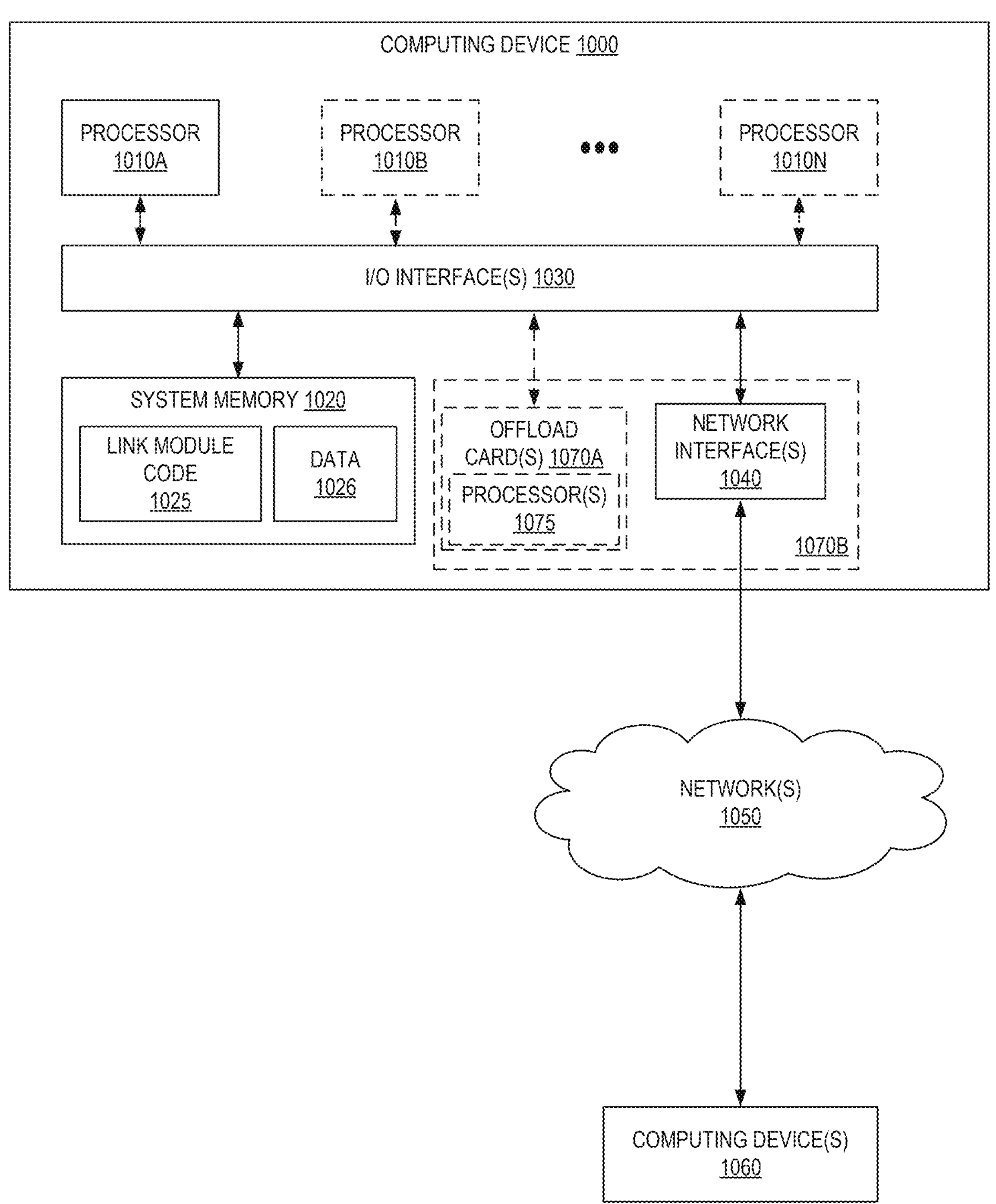
FIG. 10 is a block diagram illustrating an example computing device that can be used in some examples.

In some examples, a system that implements a portion or all of the techniques described herein can include a general-purpose computer system, such as the computing device 1000 (also referred to as a computing system or electronic device) illustrated in FIG. 10, that includes, or is configured to access, one or more computer-accessible media. In the illustrated example, the computing device 1000 includes one or more processors 1010 coupled to a system memory 1020 via an input/output (I/O) interface 1030. The computing device 1000 further includes a network interface 1040 coupled to the I/O interface 1030. While FIG. 10 shows the computing device 1000 as a single computing device, in various examples the computing device 1000 can include one computing device or any number of computing devices configured to work together as a single computing device 1000.

In various examples, the computing device 1000 can be a uniprocessor system including one processor 1010, or a multiprocessor system including several processors 1010 (e.g., two, four, eight, or another suitable number). The processor(s) 1010 can be any suitable processor(s) capable of executing instructions. For example, in various examples, the processor(s) 1010 can be general-purpose or embedded processors implementing any of a variety of instruction set architectures (ISAs), such as the x86, ARM, PowerPC, SPARC, or MIPS ISAs, or any other suitable ISA. In multiprocessor systems, each of the processors 1010 can commonly, but not necessarily, implement the same ISA.

The system memory 1020 can store instructions and data accessible by the processor(s) 1010. In various examples, the system memory 1020 can be implemented using any suitable memory technology, such as random-access memory (RAM), static RAM (SRAM), synchronous dynamic RAM (SDRAM), nonvolatile/Flash-type memory, or any other type of memory. In the illustrated example, program instructions and data implementing one or more desired functions, such as those methods, techniques, and data described above, are shown stored within the system memory 1020 as link module code 1025 (e.g., executable to implement, in whole or in part, the client-side link module 304 and/or PSE-side link module 306) and data 1026.

In some examples, the I/O interface 1030 can be configured to coordinate I/O traffic between the processor 1010, the system memory 1020, and any peripheral devices in the device, including the network interface 1040 and/or other peripheral interfaces (not shown). In some examples, the I/O interface 1030 can perform any necessary protocol, timing, or other data transformations to convert data signals from one component (e.g., the system memory 1020) into a format suitable for use by another component (e.g., the processor 1010). In some examples, the I/O interface 1030 can include support for devices attached through various types of peripheral buses, such as a variant of the Peripheral Component Interconnect (PCI) bus standard or the Universal Serial Bus (USB) standard, for example. In some examples, the function of the I/O interface 1030 can be split into two or more separate components, such as a north bridge and a south bridge, for example. Also, in some examples, some or all of the functionality of the I/O interface 1030, such as an interface to the system memory 1020, can be incorporated directly into the processor 1010.

The network interface 1040 can be configured to allow data to be exchanged between the computing device 1000 and other computing devices 1060 attached to a network or networks 1050, such as other computer systems or devices as illustrated in FIG. 1, for example. In various examples, the network interface 1040 can support communication via any suitable wired or wireless general data networks, such as types of Ethernet network, for example. Additionally, the network interface 1040 can support communication via telecommunications/telephony networks, such as analog voice networks or digital fiber communications networks, via storage area networks (SANs), such as Fibre Channel SANs, and/or via any other suitable type of network and/or protocol.

In some examples, the computing device 1000 includes one or more offload cards 1070A or 1070B (including one or more processors 1075, and possibly including the one or more network interfaces 1040) that are connected using the I/O interface 1030 (e.g., a bus implementing a version of the Peripheral Component Interconnect-Express (PCI-E) standard, or another interconnect such as a QuickPath interconnect (QPI) or UltraPath interconnect (UPI)). For example, in some examples the computing device 1000 can act as a host electronic device (e.g., operating as part of a hardware virtualization service) that hosts compute resources such as compute instances, and the one or more offload cards 1070A or 1070B execute a virtualization manager that can manage compute instances that execute on the host electronic device. As an example, in some examples the offload card(s) 1070A or 1070B can perform compute instance management operations, such as pausing and/or un-pausing compute instances, launching and/or terminating compute instances, performing memory transfer/copying operations, etc. These management operations can, in some examples, be performed by the offload card(s) 1070A or 1070B in coordination with a hypervisor (e.g., upon a request from a hypervisor) that is executed by the other processors 1010A-1010N of the computing device 1000. However, in some examples the virtualization manager implemented by the offload card(s)

1070A or 1070B can accommodate requests from other entities (e.g., from compute instances themselves), and cannot coordinate with (or service) any separate hypervisor.

In some examples, the system memory 1020 can be one example of a computer-accessible medium configured to store program instructions and data as described above. However, in other examples, program instructions and/or data can be received, sent, or stored upon different types of computer-accessible media. Generally, a computer-accessible medium can include any non-transitory storage media or memory media such as magnetic or optical media, e.g., disk or DVD/CD coupled to the computing device 1000 via the I/O interface 1030. A non-transitory computer-accessible storage medium can also include any volatile or non-volatile media such as RAM (e.g., SDRAM, double data rate (DDR) SDRAM, SRAM, etc.), read only memory (ROM), etc., that can be included in some examples of the computing device 1000 as the system memory 1020 or another type of memory. Further, a computer-accessible medium can include transmission media or signals such as electrical, electromagnetic, or digital signals, conveyed via a communication medium such as a network and/or a wireless link, such as can be implemented via the network interface 1040.

Various examples discussed or suggested herein can be implemented in a wide variety of operating environments, which in some cases can include one or more user computers, computing devices, or processing devices which can be used to operate any of a number of applications. User or client devices can include any of a number of general-purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and/or other devices capable of communicating via a network.

Most examples use at least one network that would be familiar to those skilled in the art for supporting communications using any of a variety of widely available protocols, such as Transmission Control Protocol/Internet Protocol (TCP/IP), File Transfer Protocol (FTP), Universal Plug and Play (UPnP), Network File System (NFS), Common Internet File System (CIFS), Extensible Messaging and Presence Protocol (XMPP), AppleTalk, etc. The network(s) can include, for example, a local area network (LAN), a wide-area network (WAN), a virtual private network (VPN), the Internet, an intranet, an extranet, a public switched telephone network (PSTN), an infrared network, a wireless network, and any combination thereof.

In examples using a web server, the web server can run any of a variety of server or mid-tier applications, including HTTP servers, File Transfer Protocol (FTP) servers, Common Gateway Interface (CGI) servers, data servers, Java servers, business application servers, etc. The server(s) also can be capable of executing programs or scripts in response requests from user devices, such as by executing one or more Web applications that can be implemented as one or more scripts or programs written in any programming language, such as Java®, C, C# or C++, or any scripting language, such as Perl, Python, PHP, or TCL, as well as combinations thereof. The server(s) can also include database servers, including without limitation those commercially available from Oracle®, Microsoft®, Sybase®, IBM®, etc. The database servers can be relational or non-relational (e.g., "NoSQL"), distributed or non-distributed, etc.

Environments disclosed herein can include a variety of data stores and other memory and storage media as discussed above. These can reside in a variety of locations, such as on a storage medium local to (and/or resident in) one or more of the computers or remote from any or all of the computers across the network. In a particular set of examples, the information can reside in a storage-area network (SAN) familiar to those skilled in the art. Similarly, any necessary files for performing the functions attributed to the computers, servers, or other network devices can be stored locally and/or remotely, as appropriate. Where a system includes computerized devices, each such device can include hardware elements that can be electrically coupled via a bus, the elements including, for example, at least one central processing unit (CPU), at least one input device (e.g., a mouse, keyboard, controller, touch screen, or keypad), and/or at least one output device (e.g., a display device, printer, or speaker). Such a system can also include one or more storage devices, such as disk drives, optical storage devices, and solid-state storage devices such as random-access memory (RAM) or read-only memory (ROM), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. It should be appreciated that alternate examples can have numerous variations from that described above. For example, customized hardware might also be used and/or particular elements might be implemented in hardware, software (including portable software, such as applets), or both. Further, connection to other computing devices such as network input/output devices can be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory (EEPROM), flash memory or other memory technology, Compact Disc-Read Only Memory (CD-ROM), Digital Versatile Disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various examples.

In the preceding description, various examples are described. For purposes of explanation, specific configurations and details are set forth to provide a thorough understanding of the examples. However, it will also be apparent to one skilled in the art that the examples can be practiced without the specific details. Furthermore, well-known features can be omitted or simplified in order not to obscure the example being described.

Bracketed text and blocks with dashed borders (e.g., large dashes, small dashes, dot-dash, and dots) are used herein to illustrate optional aspects that add additional features to some examples. However, such notation should not be taken to mean that these are the only options or optional operations, and/or that blocks with solid borders are not optional in certain examples.

Reference numerals with suffix letters (e.g., 918A-918N) can be used to indicate that there can be one or multiple instances of the referenced entity in various examples, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters might or might not have the same number of instances in various examples.

References to "one example," "an example," etc., indicate that the example described may include a particular feature, structure, or characteristic, but every example may not necessarily include the particular feature, structure, or characteristic. Moreover, such phrases are not necessarily referring to the same example. Further, when a particular feature, structure, or characteristic is described in connection with an example, it is submitted that it is within the knowledge of one skilled in the art to affect such feature, structure, or characteristic in connection with other examples whether or not explicitly described.

Moreover, in the various examples described above, unless specifically noted otherwise, disjunctive language such as the phrase "at least one of A, B, or C" is intended to be understood to mean either A, B, or C, or any combination thereof (e.g., A, B, and/or C). Similarly, language such as "at least one or more of A, B, and C" (or "one or more of A, B, and C") is intended to be understood to mean A, B, or C, or any combination thereof (e.g., A, B, and/or C). As such, disjunctive language is not intended to, nor should it be understood to, imply that a given example requires at least one of A, at least one of B, and at least one of C to each be present.

As used herein, the term "based on" (or similar) is an open-ended term used to describe one or more factors that affect a determination or other action. It is to be understood that this term does not foreclose additional factors that may affect a determination or action. For example, a determination may be solely based on the factor(s) listed or based on the factor(s) and one or more additional factors. Thus, if an action A is "based on" B, it is to be understood that B is one factor that affects action A, but this does not foreclose the action from also being based on one or multiple other factors, such as factor C. However, in some instances, action A may be based entirely on B.

Unless otherwise explicitly stated, articles such as "a" or "an" should generally be interpreted to include one or multiple described items. Accordingly, phrases such as "a device configured to" or "a computing device" are intended to include one or multiple recited devices. Such one or more recited devices can be collectively configured to carry out the stated operations. For example, "a processor configured to carry out operations A, B, and C" can include a first processor configured to carry out operation A working in conjunction with a second processor configured to carry out operations B and C, where the second processor could be part of same computing device as the first processor or part of a separate computing device as the first processor.

Further, the words "may" or "can" are used in a permissive sense (i.e., meaning having the potential to), rather than the mandatory sense (i.e., meaning must). The words "include," "including," and "includes" are used to indicate open-ended relationships and therefore mean including, but not limited to. Similarly, the words "have," "having," and "has" also indicate open-ended relationships, and thus mean having, but not limited to. The terms "first," "second," "third," and so forth as used herein are used as labels for the nouns that they precede, and do not imply any type of ordering (e.g., spatial, temporal, logical, etc.) unless such an ordering is otherwise explicitly indicated. Similarly, the values of such numeric labels are generally not used to indicate a required amount of a particular noun in the claims recited herein, and thus a "fifth" element generally does not imply the existence of four other elements unless those elements are explicitly included in the claim or it is otherwise made abundantly clear that they exist.

The specification and drawings are, accordingly, to be regarded in an illustrative rather than a restrictive sense. It will, however, be evident that various modifications and changes can be made thereunto without departing from the broader scope of the disclosure as set forth in the claims.

What is claimed is:

1. A computer-implemented method comprising:

deploying, by a first computing device of a provider substrate extension of a cloud provider network, a first link module in the provider substrate extension, wherein the provider substrate extension hosts compute instances of a user that operate within a virtual private cloud;

deploying, by a second computing device in a region of the cloud provider network, a second link module in the region, wherein the region includes a cloud substrate network that implements services of the cloud provider network;

generating a symmetric encryption key;

providing the symmetric encryption key to the first link module and the second link module;

receiving, at the first link module, a first encrypted request destined to a service implemented within the cloud provider network, wherein the first encrypted request was originated by a compute instance of the user that operates within the virtual private cloud within the provider substrate extension, wherein the first encrypted request was encrypted via use of an encryption scheme that encrypts traffic sent between compute instances of the virtual private cloud;

decrypting, by the first link module via use of the encryption scheme, the first encrypted request to yield a request;

encrypting, by the first link module via use of the symmetric encryption key, the request to yield a second encrypted request;

encrypting, by the first link module via use of a secure tunnel encryption method, the second encrypted request to yield a third encrypted request; and transmitting, by the first link module, the third encrypted request to the second link module.

2. The computer-implemented method of claim 1, further comprising:

decrypting, via use of the secure tunnel encryption method, the third encrypted request to yield the second encrypted request;

decrypting, by the second link module via use of the symmetric encryption key, the second encrypted request to yield the request; and causing, by the second link module, the request to be validated.

3. The computer-implemented method of claim 2, wherein causing the request to be validated includes one or more of:

validating that a source of the request is known to be present in the provider substrate extension;

validating that a source of the request is associated with a compute instance known to be present in the provider substrate extension;

validating that a virtual private cloud associated with the request is known to be present in the provider substrate extension; or validating that a physical computing device associated with the request is known to be present in the provider substrate extension.

4. A computer-implemented method comprising:

receiving, at a first link module deployed in a provider substrate extension of a cloud provider network, a first encrypted request destined to a service operated within the cloud provider network, wherein the first encrypted request was originated by a compute instance of a user that operates within a virtual private cloud of the user, wherein the compute instance is hosted in the provider substrate extension, and wherein the first encrypted request was encrypted via use of an encryption scheme that encrypts traffic sent between compute instances of the virtual private cloud;

decrypting, by the first link module via use of the encryption scheme, the first encrypted request to yield a request;

encrypting, by the first link module, the request using a separate encryption scheme that encrypts traffic between the provider substrate extension and the cloud provider network to yield a second encrypted request;

encrypting, by the first link module via use of a secure tunnel encryption method, the second encrypted request to yield a third encrypted request; and transmitting, by the first link module, the third encrypted request to a second link module deployed in the cloud provider network.

5. The computer-implemented method of claim 4, wherein the encrypting of the request via the separate encryption scheme comprises utilizing a symmetric encryption technique, wherein the first link module utilizes an encryption key that is also available to the second link module for use in decrypting the second encrypted request.

6. The computer-implemented method of claim 4, further comprising:

decrypting, via use of the secure tunnel encryption method, the third encrypted request to yield the second encrypted request;

decrypting, by the second link module via use of the separate encryption scheme, the second encrypted request to yield the request; and causing, by the second link module, the request to be validated.

7. The computer-implemented method of claim 6, wherein causing the request to be validated includes one or more of:

validating that a source of the request is known to be present in the provider substrate extension;

validating that a source of the request is associated with a compute instance known to be present in the provider substrate extension;

validating that a virtual private cloud associated with the request is known to be present in the provider substrate extension; or validating that a physical computing device associated with the request is known to be present in the provider substrate extension.

8. The computer-implemented method of claim 6, wherein causing the request to be validated comprises validating the request by the second link module.

9. The computer-implemented method of claim 6, wherein causing the request to be validated comprises:

transmitting the request, by the second link module, to a protection and processing system within the cloud provider network.

10. The computer-implemented method of claim 9, further comprising:

selecting, by the second link module based on the request, a stateful validation module of the protection and processing system to validate the request, wherein the transmitting of the request to the protection and processing system comprises transmitting the request to the selected stateful validation module.

11. The computer-implemented method of claim 9, further comprising:

receiving a response from the protection and processing system; and transmitting the response to the service operated within the cloud provider network.

12. The computer-implemented method of claim 9, wherein the second link module has connectivity to a cloud substrate network providing the service, and wherein neither the protection and processing system nor the provider substrate extension has direct connectivity to the cloud substrate network.

13. The computer-implemented method of claim 4, further comprising:

transmitting the request, by the second link module, to be processed by a secure service sibling operating within a protection and processing system of the cloud provider network, wherein the secure service sibling is a variant of the service indicated as a destination of the request;

receiving a response generated by the secure service sibling; and transmitting the response, by the second link module, via the first link module toward the compute instance that originated the request.

14. A system comprising:

a first one or more computing devices to implement a first link module deployed in a provider substrate extension of a multi-tenant cloud provider network; and a second one or more computing devices to implement a second link module deployed in the multi-tenant cloud provider network, wherein the first link module includes instructions that upon execution cause the first link module to:

receive a first encrypted request destined to a service operated within the cloud provider network, wherein the first encrypted request was originated by a compute instance of a user that operates within a virtual private cloud of the user within the provider substrate extension, wherein the compute instance is hosted in the provider substrate extension, and wherein the first encrypted request was encrypted via use of an encryption scheme that encrypts traffic sent between compute instances of the virtual private cloud;

decrypt, via use of the encryption scheme, the first encrypted request to yield a request;

encrypt the request using a separate encryption scheme that encrypts traffic between the provider substrate extension and the cloud provider network to yield a second encrypted request;

encrypt, via use of a secure tunnel encryption method, the second encrypted request to yield a third encrypted request; and transmit the third encrypted request to the second link module.

15. The system of claim 14, wherein the encrypting of the request via the separate encryption scheme comprises utilizing a symmetric encryption technique, wherein the first link module utilizes an encryption key that is also available to the second link module for use in decrypting the second encrypted request.

16. The system of claim 14, wherein the second link module includes instructions that upon execution cause the second link module to:

decrypt, via use of the secure tunnel encryption method, the third encrypted request to yield the second encrypted request;

decrypt, via use of the separate encryption scheme, the second encrypted request to yield the request; and cause the request to be validated.

17. The system of claim 16, wherein causing the request to be validated includes one or more of a:

validation that a source of the request is known to be present in the provider substrate extension;

validation that a source of the request is associated with a compute instance known to be present in the provider substrate extension;

validation that a virtual private cloud associated with the request is known to be present in the provider substrate extension; or validation that a physical computing device associated with the request is known to be present in the provider substrate extension.

18. The system of claim 16, wherein causing the request to be validated comprises validating the request by the second link module.

19. The system of claim 16, wherein causing the request to be validated comprises:

transmitting the request, by the second link module, to a protection and processing system within the cloud provider network.

* * * * *